(12) United States Patent
Regunathan et al.

(10) Patent No.: US 10,819,419 B2
(45) Date of Patent: *Oct. 27, 2020

(54) TIMING SYNCHRONIZATION FOR A BEAM HOPPING SATELLITE

(71) Applicants: Murali Regunathan, Germantown, MD (US); Yezdi Antia, N. Potomac, MD (US); Neal David Becker, Chevy Chase, MD (US); Stanley Kay, Olney, MD (US); Uday R. Bhaskar, N. Potomac, MD (US)

(72) Inventors: Murali Regunathan, Germantown, MD (US); Yezdi Antia, N. Potomac, MD (US); Neal David Becker, Chevy Chase, MD (US); Stanley Kay, Olney, MD (US); Uday R. Bhaskar, N. Potomac, MD (US)

(73) Assignee: Hughes Networks Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,363

(22) Filed: Jul. 22, 2019

(65) Prior Publication Data

US 2019/0349073 A1 Nov. 14, 2019

Related U.S. Application Data

(63) Continuation of application No. 15/914,021, filed on Mar. 7, 2018, now Pat. No. 10,361,772.

(Continued)

(51) Int. Cl.
*H04B 7/185* (2006.01)
*H04B 7/204* (2006.01)
(Continued)

(52) U.S. Cl.
CPC ....... *H04B 7/18513* (2013.01); *H04B 7/0617* (2013.01); *H04B 7/18515* (2013.01);
(Continued)

(58) Field of Classification Search
CPC .. H04B 7/0408; H04B 7/0413; H04B 7/0617; H04B 7/0695; H04B 7/086; H04B 7/088;
(Continued)

(56) References Cited

U.S. PATENT DOCUMENTS 9,099,776 B2 8/2015 Vasavada et al.
10,506,483 B1 * 12/2019 Williamson ....... H04B 7/18521
(Continued)

FOREIGN PATENT DOCUMENTS

WO 2013130778 A1 9/2013
WO 2015177779 A1 11/2015

OTHER PUBLICATIONS

Notice of Allowance for U.S. Appl. No. 15/914,058 dated Feb. 20, 2020.

(Continued)

*Primary Examiner* — Ashley Shivers
(74) *Attorney, Agent, or Firm* — Capitol City Techlaw; Jasbir Singh

(57) ABSTRACT

A system and method for timing synchronization of satellite switching instants with gateway switching instants is described. The method includes: generating satellite switching instants according to a Beam Hopping Time Plan (BHTP); generating gateway switching instants according to the BHTP; transmitting a channel addressed to a plurality of beams hopped according to the BHTP based on the gateway switching instants, wherein each of the plurality of beams includes a signal including timing markers and a guard period at an end of the signal for the respective beam; receiving a synchronization information, without a loopback (Continued)

beam, for one of the plurality of beams; determining an adjustment period and an adjusted symbol rate for the generating of the gateway switching instants, based on the synchronization information, for a transmission of the channel such that at least a portion of the guard period in a respective signal for a respective beam aligns with one of the satellite switching instants; and adjusting a timing and a symbol rate of the transmission according to the adjustment period and the adjusted symbol rate, respectively.

18 Claims, 11 Drawing Sheets

Related U.S. Application Data

(60) Provisional application No. 62/610,507, filed on Dec. 26, 2017, provisional application No. 62/610,506, filed on Dec. 26, 2017.

(51) Int. Cl.
  *H04L 7/00* (2006.01)
  *H04B 7/06* (2006.01)
  *H04W 72/04* (2009.01)
  *H04L 27/26* (2006.01)
  *H04W 28/18* (2009.01)

(52) U.S. Cl.
  CPC ....... *H04B 7/18523* (2013.01); *H04B 7/2041* (2013.01); *H04L 7/0008* (2013.01); *H04L 27/2655* (2013.01); *H04W 28/18* (2013.01); *H04W 72/046* (2013.01); *H04B 7/2048* (2013.01)

(58) Field of Classification Search
  CPC .... H04B 7/0897; H04B 7/2041; H04B 7/185; H04B 7/18508; H04B 7/1851; H04B 7/18513; H04B 7/18515; H04B 7/18523; H04L 7/00; H04L 7/0008; H04L 27/2655; H04W 84/06; H04W 72/046; H04W 28/22; H04W 28/18; H04W 56/00
  See application file for complete search history.

(56) References Cited

U.S. PATENT DOCUMENTS

| | | |
|---|---|---|
| 2006/0268738 A1 | 11/2006 | Goerke et al. |
| 2008/0002566 A1 | 1/2008 | Zhang et al. |
| 2008/0022566 A1 | 1/2008 | Busch et al. |
| 2014/0292568 A1 | 10/2014 | Fleming et al. |
| 2015/0177779 A1 | 6/2015 | Clayton et al. |
| 2015/0270890 A1 | 9/2015 | Vasavada et al. |
| 2015/0382240 A1 | 12/2015 | Hecht et al. |
| 2017/0111912 A1 | 4/2017 | Keshet |
| 2017/0288769 A1 | 10/2017 | Miller et al. |
| 2017/0289822 A1 | 10/2017 | Hreha et al. |
| 2018/0006696 A1 | 1/2018 | Yue et al. |
| 2018/0006714 A1 | 1/2018 | Hreha et al. |
| 2018/0227043 A1 | 8/2018 | Dankberg |
| 2018/0295006 A1 | 10/2018 | Ren et al. |
| 2018/0309496 A1 | 10/2018 | Lee et al. |
| 2018/0316479 A1 | 11/2018 | Rainish |

OTHER PUBLICATIONS

Final Office Action for U.S. Appl. No. 15/914,058 dated Nov. 18, 2019.
International search report for PCT application No. PCT/US2018/063300.
International search report from PCT application No. PCT/US2018/063311.
Non final office action of Apr. 18, 2019 for U.S. Appl. No. 16/914,058.

* cited by examiner

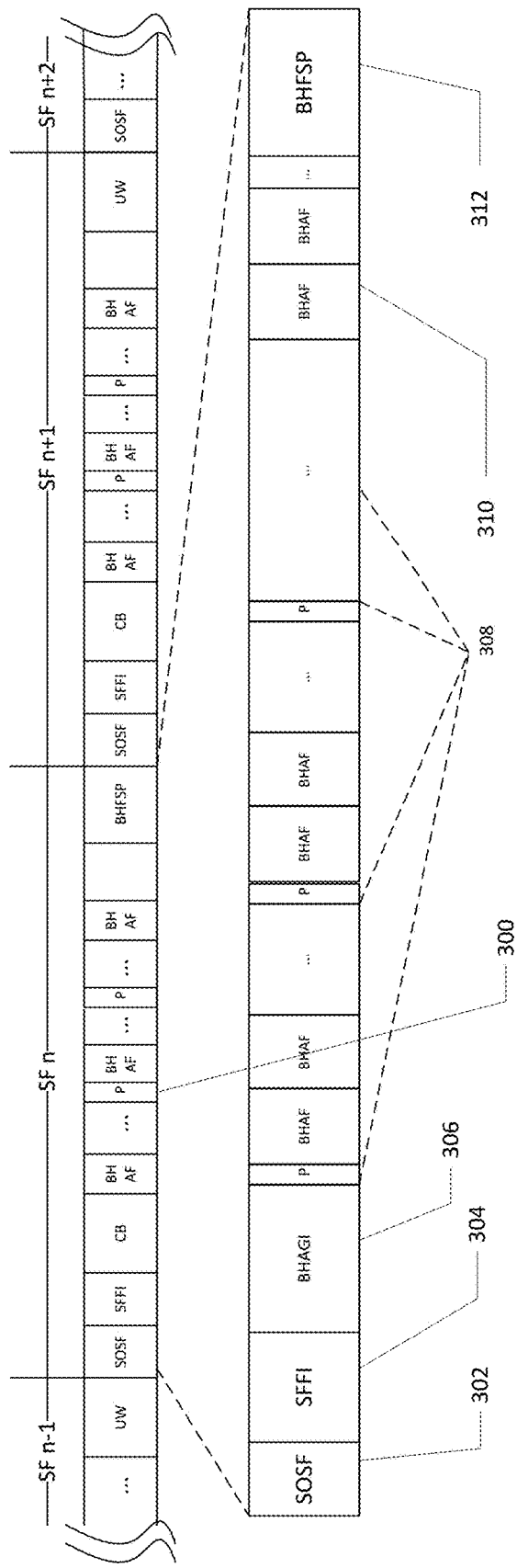
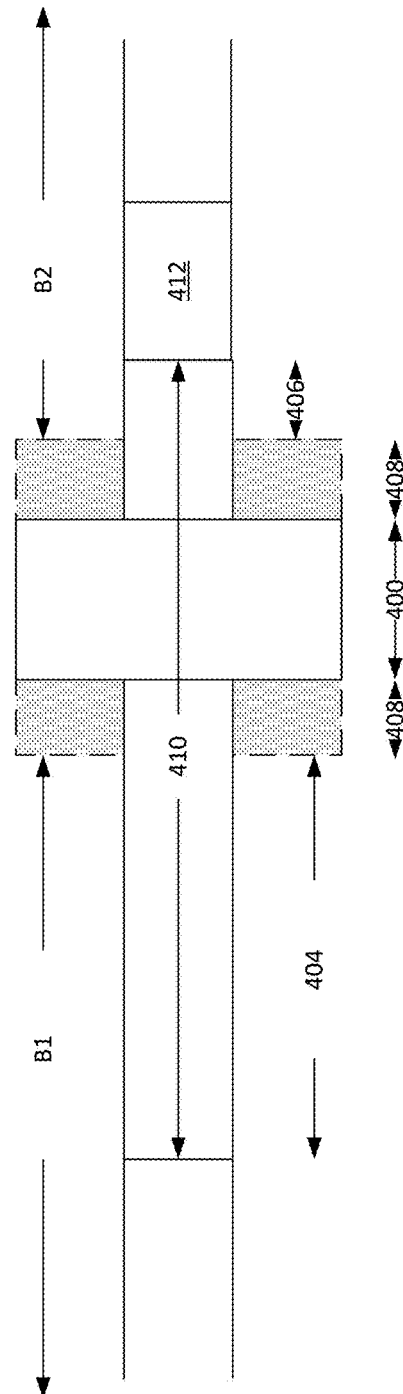
FIG. 3
FIG. 4

TIMING SYNCHRONIZATION FOR A BEAM HOPPING SATELLITE

CROSS REFERENCE TO RELATED APPLICATIONS

The present application is a continuation of U.S. patent application Ser. No. 15/914,021 filed Mar. 7, 2018 (issuing as U.S. Pat. No. 10,361,772 on Jul. 23, 2019), which claims the benefit of U.S. Provisional Patent Application Nos. 62/610,506 and 62/610,507, both filed Dec. 26, 2017, and all of which are incorporated herein in their entireties.

FIELD

The present teachings describe timing synchronization of a beam hopping satellite with a terrestrial clock. The synchronization involves transmitting a waveform including timing markers, a synchronization pattern and other relevant information to a user terminal that provides feedback information to achieve and maintain timing synchronization between the gateway switching instants and the switching instants of the satellite. In some embodiments, different waveforms are used in the phases of achieving synchronization (acquisition) and maintaining synchronization (tracking).

BACKGROUND

Beam hopping dynamically changes routing of an uplink spectrum (or a portion of it) to a downlink by a satellite. A beam hopping satellite may implement this feature in different ways and impose different constraints on the other network elements in a satellite communication system. The use of beam hopping enables the network operator to use the bandwidth and capacity flexibly across the system. For example, beam hopping may be used to decrease co-channel interference, improve frequency reuse and help increase coverage of the satellite network without having to dedicate capacity to areas with relatively less traffic.

In the prior art, although the satellite switching/beam hopping instants are programmable, there is no way to synchronize the satellite clock to an exact time of day. The present teachings use a closed loop feedback system to achieve and maintain synchronization of the network with the satellite switching time.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In exemplary embodiments, a user terminal is disposed in a coverage area of a user beam and used to provide information on a signal, for example, an outroute or forward signal, that the user terminal is receiving. The Outroute signal transmitted by the gateway may be a continuous signal with timing markers. The user terminal receives this signal when the satellite dwells on the terminal user beam. The terminal then communicates timing marker information from the signal back to the gateway. The gateway may then advance or delay the Outroute signal timing based on the timing marker information, such that the Outroute signal is synchronized with the satellite switching instants. A similar system may be used for an inroute signal from a user terminal to the gateway.

The present teachings disclose a method including: generating satellite switching instants according to a Beam Hopping Time Plan (BHTP); generating gateway switching instants according to the BHTP; transmitting a channel addressed to a plurality of beams hopped according to the BHTP based on the gateway switching instants, wherein each of the plurality of beams includes a signal including timing markers and a guard period at an end of the signal for the respective beam; receiving a synchronization information, without a loopback beam, for one of the plurality of beams; determining an adjustment period and an adjusted symbol rate for the generating of the gateway switching instants, based on the synchronization information, for a transmission of the channel such that at least a portion of the guard period in a respective signal for a respective beam aligns with one of the satellite switching instants; and adjusting a timing and a symbol rate of the transmission according to the adjustment period and the adjusted symbol rate, respectively.

The present teachings disclose a system including: a satellite switching instant generator to generate satellite switching instants according to a Beam Hopping Time Plan (BHTP); a gateway switching instant generator to generate gateway switching instants according to the BHTP; a transceiver to transmit a channel addressed to a plurality of beams hopped according to the BHTP based on the gateway switching instants, wherein each of the plurality of beams includes a signal including timing markers and a guard period at an end of the signal for the respective beam; an adjustment period determiner to receive a synchronization information, without a loopback beam, for one of the plurality of beams, and to determine an adjustment period and an adjusted symbol rate for the generating of the gateway switching instants, based on the synchronization information, for a transmission of the channel such that at least a portion of the guard period in a respective signal for a respective beam aligns with one of the satellite switching instants; and a switching instant adjustor to adjust a timing and a symbol rate of the transmission according to the adjustment period and the adjusted symbol rate, respectively.

A method for estimating timing adjustments for time synchronization of satellite switching instants with gateway switching instants is described. The method including: providing a beam hopping unit to hop a channel signal among multiple beams according to a Beam Hopping Time Plan (BHTP); transmitting the channel signal including a Beam Hopping Forward Synchronization Pattern (BHFSP) including timing markers; hopping the channel signal with the beam hopping unit; receiving a correlation length that indicates a correlation of a guard to a RX signal received at a receiver, wherein the RX signal corresponds to a portion of the channel signal; iteratively reducing the correlation length by adjusting a timing of a channel signal transmission.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail using the accompanying drawings.

FIG. 3 illustrates an acquisition waveform transmitted by a gateway according to various embodiments.

FIG. 4 illustrates a relative positioning of a guard or BHFSP, and a satellite switching instant according to various embodiments.

Figure 1:
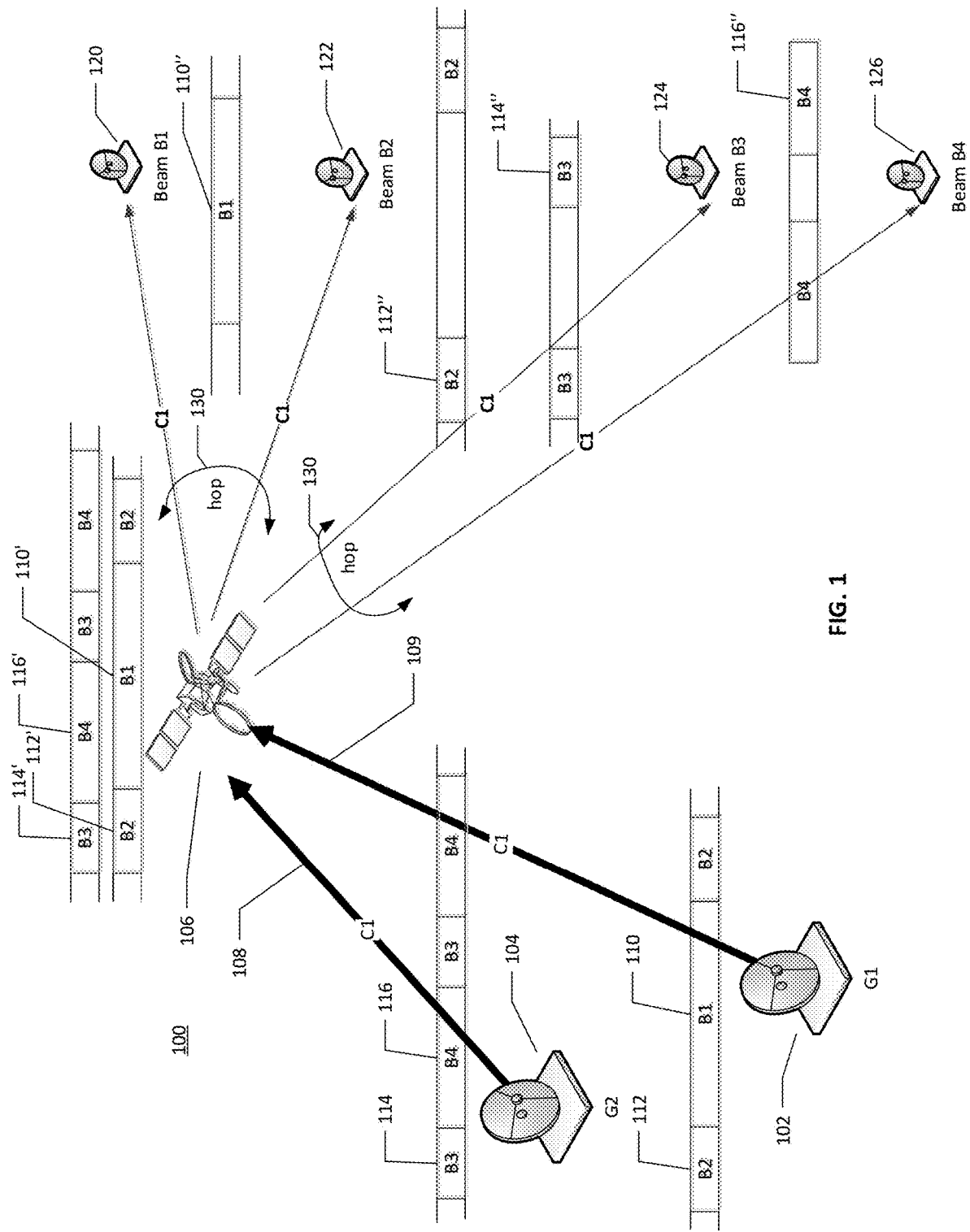
FIG. 1 is a schematic illustration of a forward beam hopping satellite system according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity but rather denotes the presence of at least one of the referenced item. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Terms, Abbreviations and Definitions

BAP—Bandwidth allocation packet
BHAF—Beam Hopping Acquisition Filler
BHAGI—Beam Hopping Acquisition Gateway Information
BHASF—Beam Hopping Acquisition Superframe
BHATI—Beam Hopping Acquisition Terminal Information
BHFSP—Beam Hopping Forward synchronization pattern
BHRSP—Beam Hopping Return synchronization pattern
BHST—Beam Hopping Synchronization Terminal
BHTF—Beam Hopping Tracking Filler
BHTP—Beam Hopping Time Plan
BHTSF—Beam Hopping Tracking Superframe
BW—Bandwidth
CLT—Closed Loop Timing
CoB—Center of (satellite) box
CONOPS—Concept of Operations
DAMA—Demand assigned multiple access
DRO—Dielectric Resonator oscillator
DVB-S2—Digital Video Broadcasting—Satellite-$2^{nd}$ generation
ECEF—Earth centered Earth fixed coordinate system
GPS—Global Positioning System
GW—Gateway
Inroute—Return (Terminal to Gateway) signal
ISL—Initial System Launch
LNB—Low Noise Block convertor
NMS—Network Management System
Outroute—Forward (Gateway to Terminal) signal
SCMA—Scrambled code multiple access
SFNP—Superframe numbering packet
SoF—Start of Frame
SoSF—Start of Superframe
STO—Space-time offset
TDMA—Time Division multiple access
ToA—Time of Arrival
UW—Unique word

INTRODUCTION

Coverage and capacity requirements of a satellite system may determine the Beam Hopping configurations. The network configurations possible with a beam hopping satellite can be numerous. If each beam hopping unit in the satellite is independent and programmable, various combinations can be constructed to allow the coverage area and capacity to be dynamically configured. The combination of sequence of the beam hopping and the dwell time on each beam may be referred to as the Beam Hopping Time Plan (BHTP). The present teachings disclose different BHTPs and a concept of operations (CONOPS) using a BHTP.

In exemplary embodiments, a user terminal is disposed in a coverage area of a user beam and used to provide information on a signal, for example, an outroute signal, that the user terminal is receiving. The Outroute signal transmitted by the gateway may be a continuous signal with timing markers. The user terminal receives this signal when the satellite dwells on the terminal user beam. The terminal then communicates timing marker information from the signal back to the gateway. The gateway may then advance or delay the Outroute signal timing based on the timing marker information, such that the Outroute signal is synchronized with the satellite switching instants.

In exemplary embodiments, the beam hopping forward synchronization pattern may be used to estimate a time difference between the actual satellite switch and the start of the BHFSP in number of symbols. This may be achieved by correlating the received signal with the known pattern and iteratively reducing the correlation length. The advantages of this method and system are:

- No loopback beam to the gateway managing the beam hopping.
- Any user terminal in a user beam may provide information to achieve and maintain synchronization.
- No separate time allotted to transmit the waveform during tracking phase.
- Works with any beam hopping satellite with minimum constraints on the satellite.
- Is more efficient than DVB-S2X Annex E Superframe (SF) format 2 which although has a unique word at the end of the SF for beam switching, uses codeblocks that are all pre-selected at the beginning of the Superframe, introducing additional latency and inefficiencies into the outroute stream.

A beam hopping satellite system offers many advantages over a conventional high throughput satellite network. The ground network system including the gateways and terminals depend on the constraints placed by the satellite beam hopping design. One challenge in such a system is to synchronize the satellite switching with the ground network. The design and requirements imposed on various elements impose minimal changes on the existing hardware or software. The present teachings address the following:

- Dynamic reconfiguration of a beam hopping time plan;
- Multiple symbol rate carriers through a beam hopping unit;
- Symbol rates that may be integral multiples of the lowest symbol rate through that unit;
- Gateway diversity; and
- GEO satellites.

In some embodiments of the beam hopping satellite, the satellite may be a Geostationary bent pipe satellite that can switch signal paths such that any one signal can be transmitted to different beams at different time instants. In some embodiments, the beam hopping may occur on a forward beam, return beam, or a combination thereof. There may be 1 to M independent switching units on the satellite, each switching bandwidth between 2 to N beams. Each beam hopping switching unit may include a switch that changes the connectivity between input and output ports with a deterministic programmable time plan. The number of input and output ports of a switching unit may be unequal. The bandwidth of the signal being switched between N beams of a switching unit may remain the same across the N beams. In some embodiments, the switching unit may support some of the redundancy switching in the transponder.

In some embodiments, in the forward direction, a signal path subject to being switched may contain one or more carriers. In some embodiments, in the return direction, a signal path subject to being switched may include one or more carriers. In the return direction, aggregation of multiple return uplink beam signal onto one return downlink may occur outside the beam hopping switch.

The M switching units might not switch simultaneously even though they may be running off the same clock. In some embodiments, the frequency reuse patterns might not allow the flexibility of switching at different times, and the switching times might have to be synchronized to the same instant. The switching occurring in the return beams might not be in the same period or order as the forward path. The beam hopping satellite may be able to switch between beams in a deterministic manner. In some embodiments, a sequence and duration of hopping may be controlled by a ground system, for example, by a network operator. The satellite may be able to change the sequence and duration of the beam hopping in orbit. In some embodiments, the Beam hopping time plan (BHTP) may be received at the satellite in advance of the intended change, for example, one second in advance of the intended change.

The forward and return beam hopping is synchronized to a satellite clock. A source of timing synchronization error after initial acquisition may be tracked. The tracking may affect the efficiency of the system with different symbol rates. These satellite clock may be free running. The forward and return beam hopping of one gateway may be achieved using the same satellite clock. The beam hopping of beams on separate gateways can have separate clocks. In some embodiments, a source of timing synchronization error after initial acquisition may be tracked. The number of clock ticks between two switching events may be programmable, for example, to support switching in different symbol rate based systems. A beam hopping switching unit on the satellite may be connected to only one gateway. The bandwidth of the carrier signal being routed to different beams by a beam hopping switching unit may remain the same between the beams being switched between.

In exemplary embodiments, a timing and a symbol rate of a transmission may be changed/adjusted to correct a misalignment. The present teachings disclose an adjustment period and an adjusted symbol rate for the generating of the gateway switching instants. The adjustment timing may alter an Outroute or Inroute timing. The adjusted symbol rate may alter an Outroute or Inroute symbol rate. In some embodiments, adjustment by the gateway may alter the timing (inroute or outroute) without altering or changing the symbol rate. An adjustment by the gateway may alter the symbol rate (inroute or outroute) without altering or changing the timing. In some embodiments, an adjustment by the gateway may alter both the timing and the symbol rate.

System BHTP

Shown here are BHTP examples that illustrate the operating scenarios that are most common and generic and are used to design the Beam Hopping system. The following notation is used to describe a BHTP:

- ( )—denotes a beam hopping cycle that will be repeated continuously.
- [ ]—denotes a beam hopping unit instant, this instant is the smallest amount of time that the beam hopper can dwell in one beam for that beam hopper set.
- [ ]$^2$ If the beam hopper unit dwells for multiple units then that is denoted by a superscript number.
- { }—denotes the set of gateway, user beam, channel or carrier (frequency & polarization) being served by the unit in one instant.
- G—Gateway, B—User Beam and C is the channel/carrier being used.

Exemplary BHTP configurations include:
1. ([{G1,B1,C1}] [{G1,B1,C1}])—no switching/hopping, how prior art systems are configured.
2. ([{G1,B1,C1}] [{G1,B1,C2}])—Outroute switching, not beam hopping.
3. ([{G1,B1,C1}] [{G1,B2,C1}] [{G1,B3,C1}])—beam hopping, sharing spectrum with B1, B2, and B3 using the same gateway G1.
4. ([{G1,B1,C1}{G1,B2,C2}] [{G1,B3,C1}{G1,B2,C2}] [{G1,B1,C1}{G1,B3,C2}])—B3 shares capacity with B1 and B2 at two different instants.
5. ([{G1,B1,C1} {G2,B3,C2}] [{G1,B2,C1}{G2,B2,C2}])—two different GWs beam hopping B2 with different sets of terminals seeing C1 and C2.
6. ([{G1,B1,C1} {G1,B2,C2}] [{G1,B3,C1}{G1,B2,C2}] [{G2,B1,C1} {G2,B2,C2}] [{G2,B3,C1} {G2,B2,C2}])—GW diversity with beam hopping.
7. ([{G1,B1,C1} {G2,B1,C2}] [{G1,B2,C1}{G2,B2,C2}])—smart diversity with beam hopping, same terminal sees C1 and C2.

Forward Beam Hopping

In a forward beam hopping satellite system, a gateway to terminal transmission is dynamically routed between user beams. The forward beam hopping satellite system includes a ground network system that includes gateways and terminals. The satellite switching the spectrum between two different user beams should switch outroute data at exactly the time as when the satellite switches a forward spectrum to a different beam.

In some embodiments, the satellite dwell time on a beam may be an integer number of DVB-S2x Annex E Superframe. In some embodiments, the satellite dwell time on a beam on the forward may be at least 1 DVB-S2x Annex E Superframe every repeat cycle.

FIG. 1 is a schematic illustration of a forward beam hopping satellite system according to various embodiments.

FIG. 1 illustrates a forward beam hopping satellite system 100 configured as a generic use case of a beam hopping system ([{G1,B2,C1}] [{G1,B1,C1}]) and (([{G2,B3,C1}] [{G2,B4,C1}]akin to scenario 3 from above. In the forward beam hopping satellite system 100 a same carrier from one gateway is hopped to multiple beams in a Time Division Multiplexing (TDM) fashion via a satellite 106.

The forward beam hopping satellite system 100 includes a gateway G1 102 communicating, through the satellite 106, with a user terminal (UT) 120 via beam B1 over channel C1 and a UT 122 via beam B2 also over channel C1. A signal 109 from G1 102 is hopped in a beam hopping unit 130 (shown as an arrow) in the satellite 106 for beam hopping occurring between the two beams B1 and B2.

Signal 109 includes a TX signal 110 from the G1 102 that is switched by the beam hopping unit to dwell on the UT 120 as a RX signal 110". TX signal 110 may be treated as hopped signal 110' at the satellite 106. Signal 109 includes a TX signal 112 from the G1 102 that is beamed to the UT 122 as a RX signal 112". TX signal 112 may be treated as hopped signal 112' at the satellite 106.

Similarly, a signal 108 from G2 104 is hopped in a beam hopping unit 130 (illustrated as an arrow) in the satellite 106 for beam hopping occurring between the two beams B3 and B4. Signal 108 includes a TX signal 114 from the G2 104 that is beamed to the UT 124 as a RX signal 114". TX signal 114 may be treated as hopped signal 114' at the satellite 106. Signal 108 includes a TX signal 116 from the G2 104 that is beamed to the UT 126 as a RX signal 116'. TX signal 116 may be treated as hopped signal 116' at the satellite 106.

In some embodiments, an RX signal is the time shifted signal based on a TX signal, wherein the time shifting includes the time to propagate a signal between a gateway and the UT via a satellite or relay. In some embodiments, a hopped signal is the time shifted signal based on a TX signal, wherein the time shifting includes the time to propagate a signal between a gateway to a satellite or relay. In some embodiments, the beam hopping unit 130 includes beam hopping units to separately handle signals from G1 102 and G2 104. In some embodiments, the BHTP of the two beam hoppers units may be independent and hence the Outroute streams transmission or arrival from the two gateways is not synchronized in time.

Let's assume that the G1 102, transmits C1 with a carrier symbol rate of 500 Msps. This carrier is transmitted to beam B1 for a certain period and then switched to B2. A UT 120 in B1 will receive its data during the time when the satellite transmits C1 to B1. If the satellite dwell time on B2 is one half of the dwell time on B1, then B2 will have a capacity which is about half the capacity B 1. In this fashion, the coverage area of the satellite 106 has been increased to allow the UT 120 and UT 122 from B1 and B2, respectively, receive data but with less capacity.

By changing the BHTP, the capacity of B1 and B2 can be changed. For example, if B1 requires most of the capacity during the daytime (for example, if most users are enterprise customers) while B2 requires the capacity during the night time, the BHTP can be configured such that the dwell time on B2 is very short during the day and very long during the night.

Return Beam Hopping

A return beam hopping satellite system follows a similar method as the forward. The beam hopper unit the return beam hopping satellite system serves the beams in a TDM fashion. The time scales for the return could be different than the forward given that most systems have lower return bandwidth. The beam hopping unit in the satellite aggregates the different signals from the various beams that are being hopped between and transmits it onto a gateway.

In some embodiments, an Inroute frame time and satellite dwell time on one beam may have an integral relationship with each other. For example, the satellite dwell time may be 5 ms and the Inroute frame time may be 45 ms. In some embodiments, the satellite may T not hop between adjacent beams using the same carrier (frequency and polarization).

Figure 2:
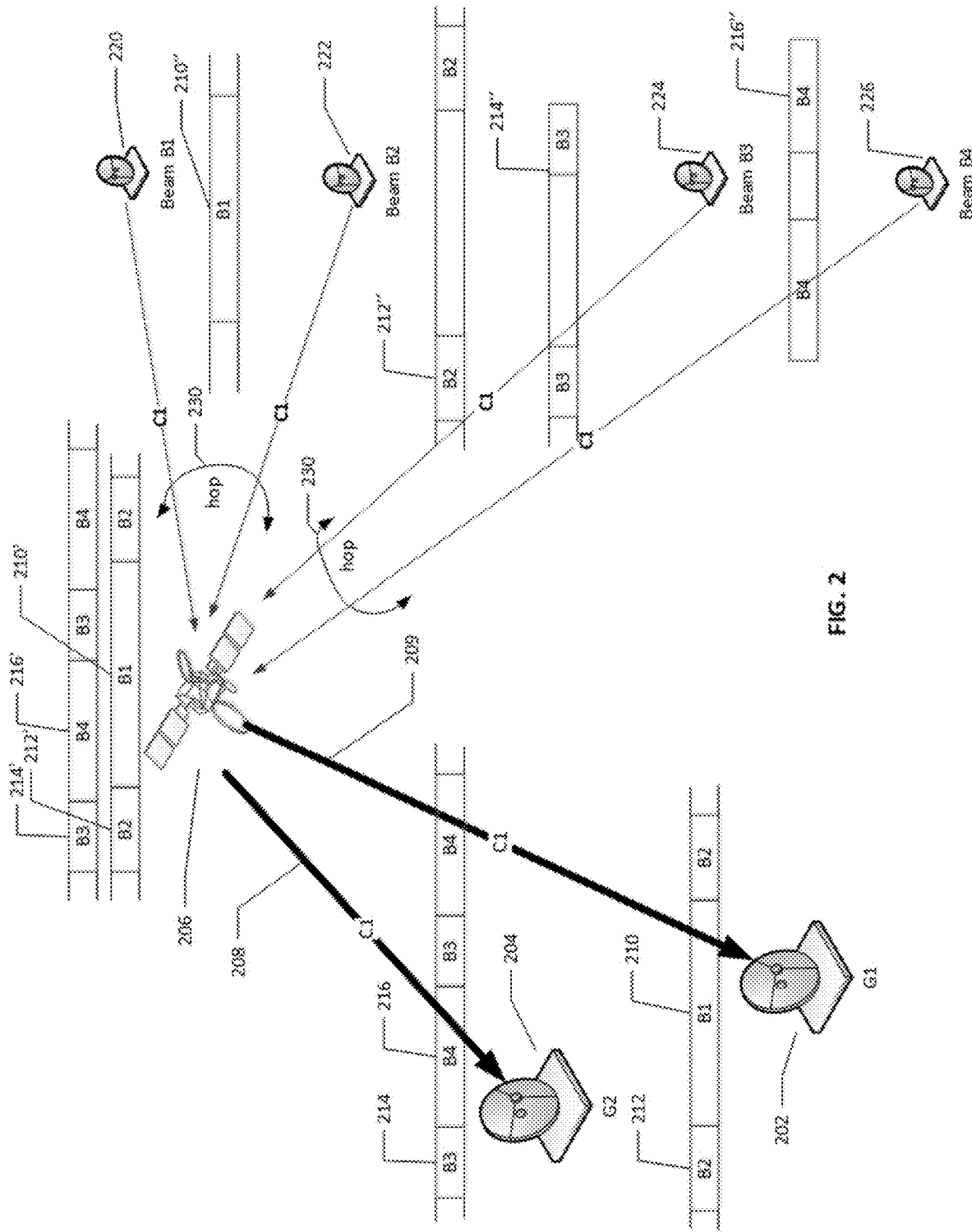
FIG. 2 is a schematic illustration of a return beam hopping satellite system according to various embodiments.

FIG. 2 is a schematic illustration of a return beam hopping satellite system according to various embodiments.

FIG. 2 illustrates a return beam hopping satellite system 200 configured as a generic use case of a beam hopping system Return Beam Hopping configured as ([{G1,B1,C1}] [{G1,B2,C1}] [{G1,B3,C1}] [{G1,B3,C1}]) akin to scenario 3 from above. In the return beam hopping satellite system 200 multiple beams on a same carrier are hopped from a user terminal to a gateway TDM fashion via a satellite 206.

The return beam hopping satellite system 200 includes a gateway G1 202 communicating, through the satellite 206, with a UT 220 via beam B1 over channel C1 and a UT 222 via beam B2 also over channel C1. A signal 209 to the G1 202 is generated in a beam hopping unit 230 (shown as an arrow) disposed in the satellite 206 by beam hopping occurring between the two beams B1 and B2 received from the UT 220 and the UT 220, respectively.

The UT 220 transmits a TX signal 210" when the beam hopping unit 230 dwells on the UT 220. TX signal 210" may be treated as a hopped signal 210' at the satellite 206. When the beam hopping unit 230 dwells on the beam B1, the beam hopping unit 230 forwards the hopped signal 210' over the signal 209. The G1 202 treats the B1 portion of the signal 209 as a RX signal 210. The UT 222 transmits a TX signal 212" when the beam hopping unit 230 dwells on the UT 222. TX signal 212" may be treated as a hopped signal 212' at the satellite 206. When the beam hopping unit 230 dwells on the beam B2, the beam hopping unit 230 forwards the hopped signal 212' over the signal 209. The G1 202 treats the B2 portion of the signal 209 as a RX signal 212.

Similarly, the UT 224 transmits a TX signal 214" when the beam hopping unit 230 dwells on the UT 224. TX signal 214" may be treated as hopped signal 214' at the satellite 206. When the beam hopping unit 230 dwells on the beam B3, the beam hopping unit 230 forwards the hopped signal 214' over the signal 208. The G2 204 treats the B3 portion of the signal 208 as a RX signal 214. The UT 226 transmits a TX signal 216" when the beam hopping unit 230 dwells on the UT 226. TX signal 216" may be treated as hopped signal 216' at the satellite 206. When the beam hopping unit 230 dwells on the beam B4, the beam hopping unit 230 forwards the hopped signal 216' over the signal 208. The G2 204 treats the B4 portion of the signal 208 as a RX signal 216.

In some embodiments, an RX signal is the time shifted signal based on a TX signal, wherein the time shifting includes the time to propagate a signal between a UT and a gateway via a satellite or relay. In some embodiments, a hopped signal is the time shifted signal based on a TX signal, wherein the time shifting includes the time to propagate a signal between a UT to a satellite or relay. In some embodiments, the beam hopping unit 230 includes beam hopping units to separately handle signals to G1 202 and G2 204. In some embodiments, the BHTP of the two beam hoppers units may be independent and hence the Inroute streams transmission or arrival to the two gateways is not synchronized in time.

By changing the BHTP, the capacity of B1 and B2 can be changed. For example, if B1 requires most of the capacity during the daytime (for example, if most users are enterprise customers) while B2 requires the capacity during the night time, the BHTP can be configured such that the dwell time on B2 is very short during the day and very long during the night.

Effect of Beam Hopping on the Terminal

Beam Hopping has the effect of interrupting the signal (transmit or receive) to a user beam. In a forward beam hopping system, the Outroute signal is interrupted while the return beam hopping interrupts the Inroute signal. The amount of disruption is dependent on the BHTP. A terminal receiver should work in a quasi-burst rather than a continuous mode.

In an exemplary forward beam hopped system, the Outroute signal that the terminal receives in two different dwell time might have different amplitude, frequency and time offsets. These offsets are bounded to enable the terminal modem to acquire the signal quickly without losing any data.

In an exemplary return beam hopped system, Inroute transmissions may occur during an instant when the Outroute signal is not present. In a return beam hopped system, the terminal may transmit when the satellite is dwelling on the beam. In exemplary embodiments, the return may be a MF-TDMA channel with bandwidth assignments performed by the gateway. The gateway may maintain synchronization on the return beam hopped system.

A Beam Hopping Synchronization Terminal (BHST) is a terminal placed in a user beam for synchronization of the satellite switching instants with the other network elements. There could be one or many BHSTs in each user beam. Each set of beams that are hopping between may have at least one BHST, not necessarily every beam in a set. In some embodiments, the BHST may be included in a user terminal. This may help when certain terminals are unavailable due to link failure.

In exemplary embodiments, the terminal may be able to receive the DVB-S2X Annex E Superframe format 0 signal. The terminal may be able to receive a DVB-S2X Annex E Superframe signal that is discontinuous. This may include changes to timing, and frequency acquisition and tracking, AGC related changes.

In some embodiments, the receiver, for example, in a user terminal, may "freeze" all the relevant loop parameters before the satellite switch to enable faster acquisition. The receiver may adjust the AGC parameters by calculating the power of a "bursty" signal. The terminal may receive the Beam Hopping Tracking Superframe (BHTSF). The terminal may receive the Beam Hopping Acquisition Superframe (BHASF). The terminal may count the number of Beam Hopping Acquisition Filler (BHAF) in a BHASF. The terminal may process the Beam Hopping Forward Synchronization Pattern (BHFSP) at the end of the BHASF and BHTSF with information received in the beginning of the BHASF. The terminal may transmit a Beam Hopping Return Synchronization Pattern (BHRSP) of programmable length repeatedly without any gaps in between. The terminal may be able to transmit without the Outroute signal being present for 32 DVB-S2X Superframes. The terminal may maintain the transmit timing and frequency even without the Outroute signal being present for 32 DVB-S2X Superframes.

Effect of Beam Hopping on the Gateway in some embodiments, the gateway beams are not subject to beam hopping. However, the gateway may operate with beam hopping on the user beams. In a Forward beam hopping, the Outroute data may change depending on the beam that the satellite is serving at the instant. The gateway in a forward beam hopping system may synchronize with the satellite forward beam switching instants and the BHTP. In a Return beam hopping system, the gateway may assign the bandwidth to terminals on the beam being served by the satellite. The gateway in the return beam hopping system may synchronize with the satellite return beam switching instants and the BHTP.

In some embodiments, all gateways use a locked clock signal, for example, a GPS disciplined master oscillator from which they derive their Outroute symbol timing. The gateway may know the BHTP of the set of beams being switched. A Network Operations Center along with a Telemetry, Tracking, and Commanding (TT&C) center may control the BHTP of the satellite. The gateway may support switching between different Outroutes in a time multiplexed fashion. Different outroutes could be directed to different beams. The gateway may transmit an Outroute on the DVB-S2X standard burst mode and using Annex E Superframe format 0. The gateway may transmit BHASF and BHTSF. The gateway may be able to advance or delay timing of the Outroute signal by symbols. The gateway may be able to change the Outroute symbol rate in a step of symbols per second. The gateway may receive information from the BHST and track the timing and frequency offsets during normal operation. The gateway may allocate bandwidth to the beams in the Inroute in a time multiplexed sense. The gateway may be able to advance or delay the timing of and Inroute Superframe marker The gateway may be able to increase or decrease the time duration between two Inroute Superframe markers in steps.

The gateway may receive the repeated BHRSP pattern as transmitted by the BHST from different beams. The gateway may count the number and record the instant each BHRSP was received. The gateway may estimate the number of symbols received in the BHRSP. The gateway may control the SFNP timing for each set of beams being hopped independently. The gateway may have the same SFNP timing markers for the Inroute demodulator (IDM) and Outroute modulator (OMM) of a set of beams switched by the same satellite beam hopping unit.

In some embodiments, a gateway may not receive its own transmission. Each user terminal may receive signals from only one gateway. At least one synchronization terminal may be present in a set of user beams being switched. All the beams being switched between may operate either on the same carrier symbol rate or on an integral multiple of the lowest symbol rate in the set.

Outroute Synchronization in a Forward Beam Hopping System

Forward timing synchronization enables the switching of the gateway Outroute signals to coincide with the switching of the satellite. Each gateway has the information about the switching sequence, and the dwell time on each beam of the switching set but it doesn't know the exact satellite switching time instant. The gateway might not see its own transmission. To be able to synchronize the gateway to the satellite switching time, a closed loop feedback from a Beam Hopping Synchronization Terminal (BHST), in one of the beams served by the gateway, receives the signal and reports back the timing error in a gateway transmission. The gateway then uses this information to advance or delay the transmit timing pertaining to a set of beams.

In exemplary embodiments, a series of timing markers may be transmitted from the gateway to the BHST to aid in synchronization. These timing markers arrive at the BHST after a certain time delay. Since the satellite is switching between a set of beams, a terminal in one beam will receive only certain timing markers while the remaining timing markers will be transmitted to the other beams. When the BHST(s) report back the information about which timing markers they have received, the gateway may adjust the timing of the transmitted signals, such that the timing markers align with the beams they are supposed to be received in.

In some embodiments, for example, the DVB-S2X Annex E Superframe Format, a start of Superframe (SOSF) boundary may serve as a timing marker. The Superframe boundary varies with the symbol rate of the signal because the number of symbols in a Superframe is fixed and hence the symbol rate dependent marker may be synchronized to an actual timing instant on the satellite. The different signals through a switching unit may have the same symbol rate or have symbol rates that are an integral multiple of the lowest symbol rate of the set to allow the switching to occur on the Superframe boundary for all the different signals.

During startup, for example, at gateway commissioning, the satellite switching instant and the gateway switching time might not be synchronized. The gateway might switch Superframes ahead or later than at the required instant. In a timing acquisition phase, such as, achieving timing synchronization during system initialization, provisioning, system reset or restart or the like, the gateway switching should occur within a few symbols of the satellite switching instant. The acquisition phase may be divided into three stages:

Stage 1—At the end of this stage synchronization will be within a Outroute Superframe (+/−Superframe length/ 2)

Stage 2—At the end of this stage synchronization will be within the BHFSP length Stage 3—At the end of this stage synchronization will be within a few symbols FIG. 3 illustrates an acquisition waveform transmitted by a gateway according to various embodiments.

In exemplary embodiments, to assist in acquisition, a waveform 300 may be transmitted continuously by a gateway. Any terminal in the beams being switched between may receive this signal. The wave form may be sent at a most robust FEC rate possible and mapped, for example, as QPSK symbols. This waveform may be referred to as the Beam Hopping Acquisition Frame (BHASF). An exemplary BHASF for use with the DVB-S2X standard may contain the following segments in order:

Start of Superframe marker (SOSF) 302 (270 symbols) as defined in DVB-S2X standard SFFI 304 (450 symbols) as defined in DVB-S2X standard. In the SFFI 304, a bSFFI may be set as a reserved code of the DVB-S2X standard, for example, 0x1010 may be used to denote that this Superframe has a BHFSP at the end.

A BHAGI or codeblock 306 that is a programmable 'n' CUs (each CU=90 symbols). In some embodiments, an exemplary BHAGI illustrated in Table 1 below may be disposed in the codeblock 306 in an acquisition waveform.

Synchronization Information 308 to assist in acquisition as shown, for example, a pilot signal. In some embodiments, the pilot of synchronization information 308 may be 26 symbols after every 1440 symbols or 16 CUs.

Beam Hopping Acquisition Filler (BHAF) 310–4 CU (4*90=360 symbols). A reserved PLS code (46) may be used to create this filler. The BHAF 310 may consist essentially of a SOF, PLSCode and data. In some embodiments, the SOSF, SFFI or the data may be scrambled.

Beam Hopping Forward Synchronization Pattern 312 (M+36 symbols for the last pilot block). The length of the BHFSP may be configurable, M may be a multiple of 90.

A BHTSF may contain the same segments as a BHASF. In some embodiments, the BHTSF may omit the BHAGI.

TABLE 1

Beam Hopping Acquisition Gateway Information (BHAGI)
BH Acquisition Gateway Information (BHAGI)

| Bits | | | | |
|---|---|---|---|---|
| 31 | 23 | 15 | 7 | 0 |
| Information | Outroute Superframe Number | | | |
| | Gateway ID | | Beam ID | |
| | Inroute Frequency Assignment | | Inroute Timeslot Assignment | |
| | $T_{HSH}$ | | BHFSP Length (in symbols) | |
| | Local Delay denoting the sum of the GW delay and the delay from the Superframe 360 ms marker | | Inroute Superframe Number | |
| | | Number of BHFSP correlation values to collect before sending in stage 3 | Number of Superframes to collect information in stage 1 | Acquisition/Tracking phase |
| | | Other Information . . . | | |

The BHAGI codeblock as shown in Table 1 may include a 32-bit Outroute Superframe number to mark each Superframe that goes out on Outroute. At a carrier symbol rate of 2 Gsps this number will reset after 15 days and 5.39 hours. The GWID may reflect the gateway transmitting the waveform and the beam ID may reflect the beam the signal was meant for. The inroute frequency and timeslot assignment information may tell the BHST which channel to transmit back on. All the channel assignments for the beams that belong to the switching set in the BHTP may be sent in the BHAGI. The information in this codeblock may change with the beam that the gateway is transmitting to.

The BHFSP length denotes the length in symbols of the unique word placed at the end of the Superframe. The THSH, Inroute Superframe number and the Local delay may help the BHST to synchronize the transmission of the burst to the receive window at the gateway. The acquisition/tracking phase may convey to the BHST what stage of the synchronization process is the system in. 'Number of Superframes' to collect information may tell the terminal to record data over a minimum of this period before sending the data back. Number of BHFSP correlation values to collect may indicate the number of values to be collected before sending a message back. Table 1 may not include all the information that could be needed.

A new Beam Hopping Acquisition Filler (BHAF) may be created for use in the acquisition waveform. The DVB-S2X dummy PLframe has 36 CU of 90 symbols each and is hence very large to be used as a filler when there might not be 36 CUs available to be filled in the end of a Superframe. In some embodiments, the BHAF may help in the stage 2 of acquisition.

BHFSP at the end of the Superframe may consist of M symbols (M being a multiple of 90 symbols) plus an additional symbols, for example, 36 symbols, that would have been the pilot symbols. The BHFSP length may be notified to the terminal via the BHAGI codeblock information. The BHFSP may serve two purposes. It may be the guard period during which the satellite switching may occur. It may be used for synchronization by finding the length of BHFSP received by the BHST, the instance when the satellite switch occurred.

Stage 1

Initially the gateway and satellite switching instants might be misaligned by a multiple number of Superframes. At the start of stage 1 of acquisition, a BHST may look for the SOSF pattern. Once the terminal acquires the SOSF pattern, the terminal may check the SFFI to determine whether this is a Superframe that ends with a BHFSP. During acquisition phase, the transmitted signal may include a BHFSP at the end of each Superframe. The first codeblock after the SFFI may contain the BHAGI including the Superframe number and the beam ID for which the Superframe was intended. The BHST may include the frame number and the corresponding beam ID. The terminal may count and record the number of Beam Hopping Acquisition Fillers (BHAFs) received in every Superframe.

The information may be recorded by the terminal and sent back to the gateway using the frequency and channel assignment provided in some embodiments. In some embodiments, the information may be sent back via an out of band channel. Any frequency/timeslot may be assigned for the terminals to send the information back. It need not be restricted to the ALOHA channels. The system may use Asynchronous SCMA, making the channel assignment easier.

In exemplary embodiments, a TDMA return synchronization relies on a system of SFNP packets arriving at a regular time tick, for example, every 360 ms, on the Outroute. In a beam hopping system, the SFNP packet will not be received by all beams. To guarantee that every beam receives the SFNP regardless of the beam switching configuration, the SFNP may be sent in the Superframe at the beginning of the dwell time. Since the SFNP timer is not tied to the Outroute Superframe time, the terminal on receiving the SFNP would not know how far in the interval between SFNPs the GW is. A local delay field in the SFNP may be used to convey the sum of the GW delay and the time elapsed from the SFNP marker.

The terminal may use the SFNP marker and the local delay along with the $T_{HSH}$ to calculate the $T_{RO}$ to be applied to the burst to be transmitted. The frame and timeslot may be assigned to the terminal by the gateway. The terminal may transmit on the frequency/timeslot assignment it receives. If there are multiple BHSTs in a beam, then the assignment for them would have to be done accordingly. In some embodiments, the SOSF marker may be used as a timing marker for the return path as well. The allocation of the time slots from the gateway to the terminal may be made relative to the SOSF timing marker and may be in the number of Outroute symbols. The number of symbols can be converted by the terminal in to a time-based parameter depending on the Outroute carrier symbol rate. The terminal can calculate the TRO to be applied based on the THSH, the SOSF marker and the time delay from the SOSF marker.

If a TDM return channel is available, then the information may be sent back without worrying about the timeslot assignment. The terminal may use the DVB-S2X Superframe format 0 to transmit the information. A receiver at the gateway may continuously search for the SOSF marker and once synchronized receive the information being sent by the terminal.

The terminal may wait a minimum of the Superframes as defined in the BHAGI in Table 1 above before sending the information back to the Gateway. The allocation of a timeslot to transmit on may be determined by the GW. The terminal may be allocated multiple timeslots on every Inroute Frame to ensure that the terminal after having recorded the required amount of data can transmit without delay. The time gap between the allocated timeslots in one Inroute Frame may not be much greater than the number of Outroute Superframes to wait. This prevents the terminal from having to send two different sets of recorded information back at the same time.

When the terminal receives the SFFI, the terminal confirms that the first codeblock included that Superframe. The terminal might not receive the full Superframe but only the beginning. The number of BHAFs indicates how much of the Superframe the terminal has received. Table 2 shows an exemplary Beam Hopping Acquisition Terminal Information (BHATI) structure. The BHST may use the BHATI to send the necessary information to the gateway. The BHATI may include BHST specific information like Terminal ID, Beam ID and the like, and synchronization information regarding the Superframes the BHST received. Information from each recorded Superframe may be sent via the BHATI back to the gateway.

The terminal may send the data back to the gateway. The Gateway may accumulate data from the various BHSTs and change the Outroute timing to align more closely with the satellite switching time. In some embodiments, the BHFSP received length estimation may not take place until Stage 3 of Acquisition and/or Tracking phase.

TABLE 2

BH Acquisition Terminal Information (BHATI)

| Bits | | | | |
|---|---|---|---|---|
| 31 | 23 | 15 | 7 | 0 |
| Terminal Information Synchronization information | Terminal ID | | | |
| | Beam ID | | | |
| | Superframe Number N | | | |
| | Gateway ID | | Beam ID | |
| | Estimated BHFSP Length | | Number of BHAF | |
| | Other Info | | Outroute SNR | |
| | Superframe Number (N + 1) | | | |
| | Gateway ID | | Beam ID | |
| | Estimated BHFSP Length | | Number of BHAF | |
| | . . . | | | |

The Gateway uses the exact order of switching between the beams, the amount of time the satellite dwells in each beam, and information from the BHST to ascertain whether the gateway is switching earlier or later than the satellite. If the initial gateway switching is not synchronized, then the BHST may receive a Superframe not meant for its beam. If the BHST sees only Superframes meant for the BHST, then the timing of the gateway switching is accurate to one frame and the system may transition to stage 2 of acquisition. If the BHST receives a Superframe not meant for the BHST, the gateway Outroute timing is moved.

The gateway may advance the timing of the Outroute by the exact number of Superframes such that each BHST receives only the Superframes meant for itself. The gateway moves the Outroute timing an integer number of frames. This can occur if the switching instant occurs during the SOSF, SFFI or BHAGI. If no BHATI information is received, then the Gateway may assume that the SOSF, SFFI or BHAGI did not reach the terminal. In this scenario, the gateway may advance timing of the transmission by half a Superframe and wait again.

Stage 2

At the beginning of stage 2 of acquisition, the BHSTs in each beam may be partially receiving the Superframes intended for their beam. For example, the satellite may be switching in the middle of Superframe (n−1) so a portion of n−1 may be transmitted to Beam 2, while Beam 1 receives n−1 Superframe partially. To move the Outroute switching time closer to the satellite switching instant, the BHST may count the number of timing markers, for example, BHAFs, received in each Superframe and send this information back to the gateway as part of the BH ATI. The BHAF may be a 360-symbol special FRAME including, for example, a SOF, PLHEADER, and information. A BHAF may be counted only if the PLHEADER is received in its entirety and is decoded. The last Superframe received in a dwell time would be received partially and will have fewer BHAFs than all the other Superframes that include a full count of BHAFs.

The number of BHAFs transmitted in a Superframe may be dependent on the size of the BHAGI information being sent by the gateway for that beam. The gateway may calculate the time to advance the timing based on the total number of BHAFs transmitted in a Superframe for that beam and the number received by the BHST in the last Superframe of the dwell time. The gateway may then move the timing of the Outroute such that the BHST receives all the BHAFs and a one half of a guard, for example, the BHFSP [360*(Number_BHAF_missed−1)+180+Number of BHFSP symbols/2), in the last Superframe of the dwell time. The GW and Satellite switching instants after this timing movement should be aligned within a midpoint off the card, for example, +/−180 symbols of BHFSP midpoint. The BHFSP length may be at least 360 symbols to prevent a satellite switch from falling out of the Superframe.

Stage 3

After Stage 2 of acquisition, the satellite switching is occurring about the middle of a guard, for example, the BHFSP. Once the system moves in to the Stage 3, the switching is close to a destination symbol, in other words, where it is required to be. The point of switching may be system configurable. The switching may occur anywhere inside the guard or BHFSP. This allows enough flexibility based on the guard or BHFSP length, and operational parameters like SNR and satellite switching time.

FIG. 4 illustrates a relative positioning of a guard or BHFSP, and a satellite switching instant according to various embodiments.

A satellite switching time 400 is a finite amount and during this interval, no signal is assumed to be transmitted to user beams B1, B2. Due to a satellite clock (not shown) uncertainty, a certain amount of ambiguity 408 may be present in the start and end times of a switching interval 402. A guard signal or BHFSP 410 may overlap the satellite switching time 400. A portion of a guard BHFSP signal 404 received by B1 in FIG. 1 may be used to estimate the amount of timing movement required by a gateway or terminal (not shown). To calculate the length of the BHFSP, the switching interval 402, a BHAF length (360 symbols) and detecting the portion of guard BHFSP signal 404 received by B2 should be considered. A portion of BHFSP 406 may be received by B2. The portion of BHFSP 406 may immediately be followed a SOSF 412.

For example, let's assume the time required by the satellite to switch is around 150 ns (including the satellite clock stability over short term). Assuming a carrier symbol rate of 2 Gsps, this time is equivalent to 300 symbols. Assuming the BHFSP length required to estimate the number of received symbols is 100 at the operational SNR. A good BHFSP length then with a 5% margin and rounded to the nearest multiple of 90 symbols becomes $$\left\lceil \frac{1.05 \times (300 + 100)}{90} \right\rceil \times 90 = 450$$

The minimum length may be equal to the length of the BHAF if the switching interval is zero. The GW Outroute switching time may be less than the satellite switching time and may occur simultaneously. In some embodiments, the GW switching time may be a primary basis to determine a length of the BHFSP.

In exemplary embodiments, the gateway may transition from using only the BHASF and BHAF received information from the BHST to using the BHFSP information. The last Superframe before the switch may have a shorter number of BHFSP symbols received value than the Superframe's in the name. The BHST knows the exact location of the start of the BHFSP (fixed number of symbols from SOSF). The BHST may estimate the number of received BHFSP symbols in the incoming signal and send the estimated value back to the gateway. When the satellite switch happens ahead of time, a smaller portion of the BHFSP will be received by the BHST. Analogously, a larger portion of the BHFSP will be received if the switch happens later.

The estimated values may be returned to the gateway using the BHATI described in Table 2. The number of BHFSP estimation values to collect before sending the message back may be configurable. The gateway may use this information to advance or delay its Outroute timing. Once the Outroute timing is moved to within a symbol of the desired time, the system may move to the tracking phase.

An exemplary BHFSP may include 256 QPSK mapped symbols that adhere to the DVB-S2X gray code mapping. The BHFSP length may be system configurable. The pattern may be system configurable. The pattern may be programmed in the terminal before startup.

Figure 5:
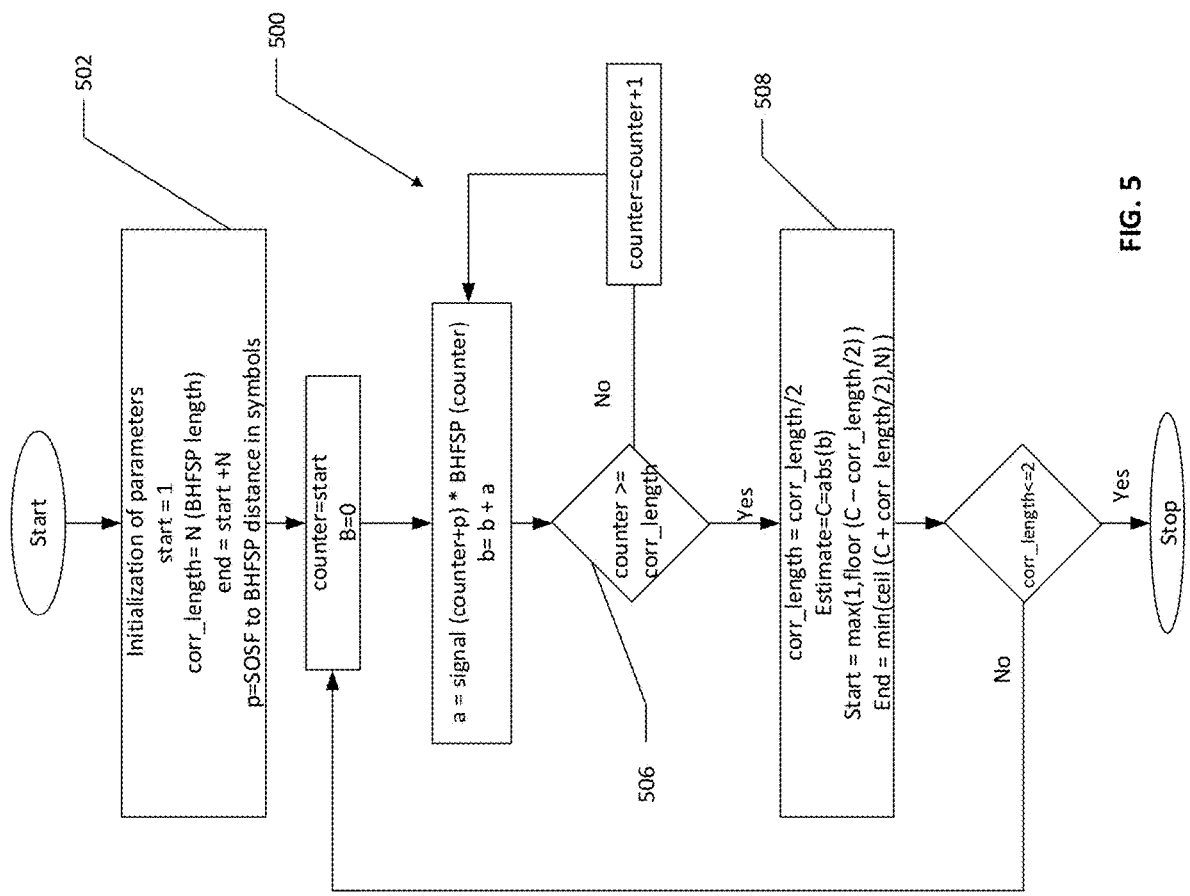
FIG. 5 illustrates a flow chart of a process of estimation of number of BHFSP symbols received according to various embodiments.

FIG. 5 illustrates a flow chart of a process of estimation of number of BHFSP symbols received according to various embodiments.

FIG. 5 illustrates a process 500 by which a length or the number of BHFSP symbols received may be estimated by the value of the correlation per operation 508. In the process 500 begins with initialization per operation 502. The correlation is calculated until a counter is greater than a correlation length per operation 506. The correlation of operation 508 may be calculated as:

$$c = \left| \sum_{n=1}^{N} x(n) * s(n) \right|,$$

where x(n) is the received signal and s(n) is BHFSP, N is the length of BHFSP

Since the variance is proportional to N, to improve the performance of the estimator a binary search process may be used, where the N is consecutively reduced by half, and correlation is done with that half of the signal in which the previous estimate was present. In general, the signals x and s are complex, so the equation should be read as x(n)·s(n)*, where · denotes elementwise multiplication and * denotes complex conjugate.

Tracking Phase

Figure 6:
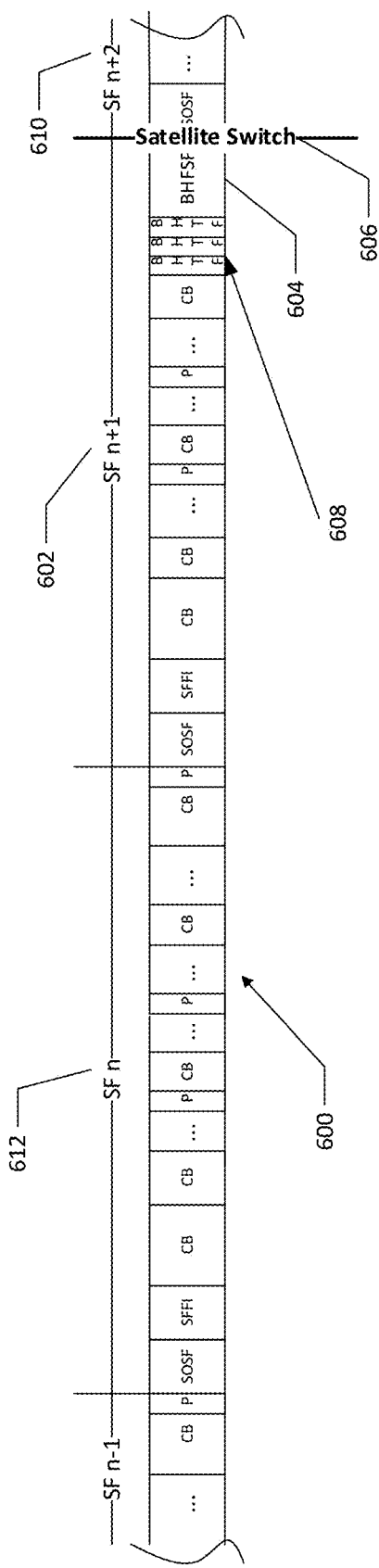
FIG. 6 illustrates a tracking waveform according to various embodiments.

FIG. 6 illustrates a tracking waveform according to various embodiments.

After acquisition is complete, the system moves in to a tracking phase and is ready for normal operation in which user terminals can be commissioned. During the tracking phase, one or more BHSTs help the gateways stay synchronized with the satellite switching. A transmit waveform 600 from a gateway (not shown) may include a termination Superframe 602 terminated by a BHFSP 604 before a satellite switching instant 606. The termination Superframe 602 is termed as a Beam Hopping Tracking Frame (BHTSF). In exemplary embodiments, the BHFSP length in the tracking phase can be different from the length used in the acquisition phase. The BHFSP 604 is sent in the termination Superframe 602 that falls in a satellite switching instant 606 in the tracking phase. Superframes targeting the same beam that are preceding the termination Superframe 602, for example, the Superframe 612 need not include a BHFSP. In contrast, in the acquisition phase, a BHFSP may be sent in every Superframe. The termination Superframe 602 before the satellite switch 606 may denote itself as a termination Superframe with an indicator, for example, with a bSFFI of 0x101. In some embodiments, PLFRAIVIES may not rollover to the next Superframe after the satellite switch. Since the information CodeBlocks in the BHFSP might not fit in the time available, a Beam Hopping Tracking Filler (BHTF) 608 may be used to pad the termination Superframe 602. The BHTF 608 may include 90 symbols including a SOF and a PLSCODE. A Superframe 610 immediately following the termination Superframe 602 may dwell on a different beam.

Figure 7:
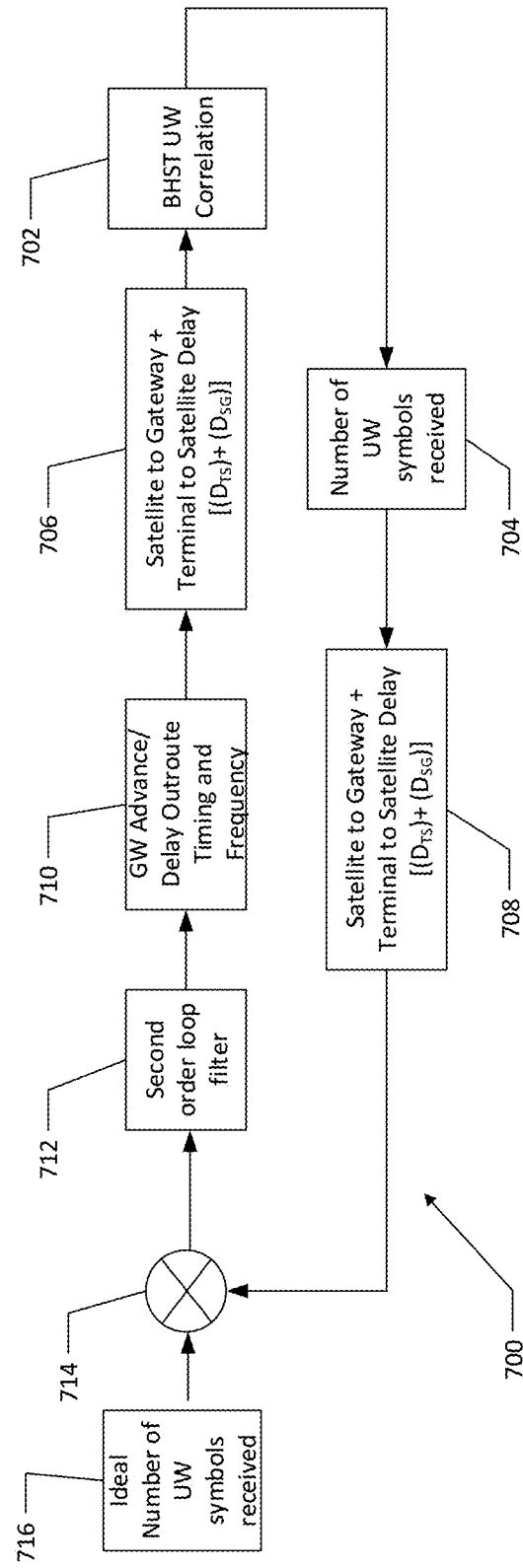
FIG. 7 illustrates a feedback system to track and correct errors during a tracking phase according to various embodiments.

FIG. 7 illustrates a feedback process to track and correct errors during a tracking phase according to various embodiments.

A feedback process 700 may be used to track errors that might make the system lose synchronization achieved during acquisition. A BHST correlation at operation 702 may estimate the number of symbols received from the BHFSP pattern and transmit this information back to a gateway. At operation 710, the gateway may adjust the Outroute timing and symbol rate. The estimates and/or correlation of operation 702 from the BHST may be returned to the gateway using the BHATI. Per operation 716, the number of estimates to collect before sending the message back may be configurable and may be dependent on the BHTP. Just as in stage 3 of acquisition, the estimates allow the gateway to either advance or delay its Outroute timing. In the feedback system, a second order loop filter 712 may be used to correct both phase and frequency shifts. Operation 706 may determine a delay from a gateway to a satellite plus the satellite to a terminal delay. Operation 708 may determine a delay from the satellite to the gateway plus the terminal to the satellite delay.

There may be multiple sources of timing drift in a satellite network that cause the synchronization to fail after acquisition if no tracking mechanism present. Without limitation, some of the sources are deterministic and some random and are presented here. These errors might add destructively or constructively.

Although a geostationary satellite appears to be stationary over the earth, its relative position is not completely fixed. The satellite's position relative to the earth is maintained by station keeping maneuvers within a cuboidal box of a fixed size. Within this cuboidal box, the satellite motion introduces changes in delay between the satellite and ground network elements. The satellite position change introduces delay differences and the velocity of the motion introduces a Doppler shift. In a beam hopping system a change in the delays between the satellite and the ground network changes the switching instants as seen by the ground network. For example, if the satellite is moving away from the Gateway, then the arrival time of the signal may be delayed at the satellite. This may result in the SOSF markers of the Outroute arriving late and may be no longer synchronized with the satellite switching time. If the satellite was moving towards the gateway, then the signal may arrive earlier at the satellite and again cause misalignment. Since the satellite is constantly moving, there may be a drift in the alignment error correction. On the Outroute, the change in timing in Gateway to satellite path may cause the error.

On the Inroute, the change in the timing between the satellite and terminal introduces the error. The existing Inroute synchronization may account for this change by providing timing feedback from the gateway to the terminals and allowing the terminals to change their transmit timing. In a system with return beam hopping, the switching instants may be synchronized as well.

A satellite clock impacts the time instants when the switching occurs and a duration between them. Any differences between the satellite clock may cause misalignment to the time synchronization in a similar fashion as the satellite motion. In some embodiments, a resolution of the satellite clock duration or the frequency of the clock may introduce a timing error. The satellite switching is based on actual time whereas the Outroute Superframe duration is a function of the carrier symbol rate. The synchronization between the satellite and outroute can be perfect only if clock duration of the satellite is the same as the Outroute. If there is a mismatch between the two, the result may be a shift in the alignment between the Outroute and Satellite switching instants. Misalignment from jitter variations may include jitter in the gateway clock, jitter in the satellite clock, timing delays between the actual error and its correction etc. Most of these should be averaged out by the loop design.

In some embodiments, an estimation process of the acquisition phase may be used in the tracking phase.

In the feedback process 700, a second order loop filter 712 may be used to correct for timing shifts as well as frequency shifts. The satellite to GW delay and terminal to satellite delay may impact the feedback loop. Other considerations in the loop filter are the deviation in symbols between SOSF markers that the terminal can tolerate, the number of BHFSP responses available per second and the number of BHST available in different beams.

At the terminal, a change in Outroute symbol rate may affect the Inroute transmit frequency and may be accounted for in the Inroute burst demodulator. A BTR loop of the Terminal Modem may accommodate a certain maximum jump in the Outroute symbol rate. The change the gateway makes on the symbol rate may not be greater than this value. The SOSF search window of the Terminal Modem limits the timing change in the Outroute by the gateway. In some embodiments, when a BHST misses a desired consecutive number of SOSF markers, then the system may go through acquisition.

Gateway Applying Corrections

The timing corrections in the acquisition phase may be large. In stage 1 the timing corrections may be on the order of Superframes, and in stage 2 the timing corrections may be in the order of a half Superframe. The changes may be known at least 2 Superframes in advance. In some embodiments, the timing may be only advanced in the acquisition phase. There may be no second order timing changes of the Outroute in the acquisition phase.

In the tracking phase, the gateway may make timing corrections on the order of a few symbols. The amount of correction and the interval at which it happens may depend on the amount of clock drift present in the system. All the blocks in the transmit path may be synchronized to timing change. The data in the transmit path (due to filter delays etc.) should not be discarded unless the delay in symbols is very small. In some embodiments, a redundant path that can be used as a ping-pong to implement this. The timing changes may be in the order of a few symbols.

In some embodiments, a gateway may change the symbol rate of the Outroute carrier, while keeping the number of symbols between two SOSF markers the same. The actual time between two Outroute SOSF markers may change. In other embodiments, the number of symbols between two SOSF markers may be changed by adding or dropping symbols.

Changing the Outroute symbol rate and keeping the number of symbols between two Outroute SOSF markers constant may allow the tracking of a timing drift (frequency shift). The amount of symbol rate change may be calculated from the difference in the estimated number of BHFSP symbols received by the BHSTs.

The terminal may receive a different symbol rate than the one programmed. However, the terminal may still receive the same number of symbols between two SOSF markers. Adding or dropping symbols within an Outroute Superframe is akin to a timing shift and not a frequency shift. It can have the same effect of changing the symbol rate if applied continuously every Superframe. The BHTSF may have many symbols that depend on the Doppler correction required.

The terminal may receive the same symbol rate as the one programmed (discounting the other Doppler effects). In some embodiments, the terminal may not receive the same number of symbols between two SOSF markers.

Inroute Synchronization in a Forward Beam Hopping System

Figure 8:
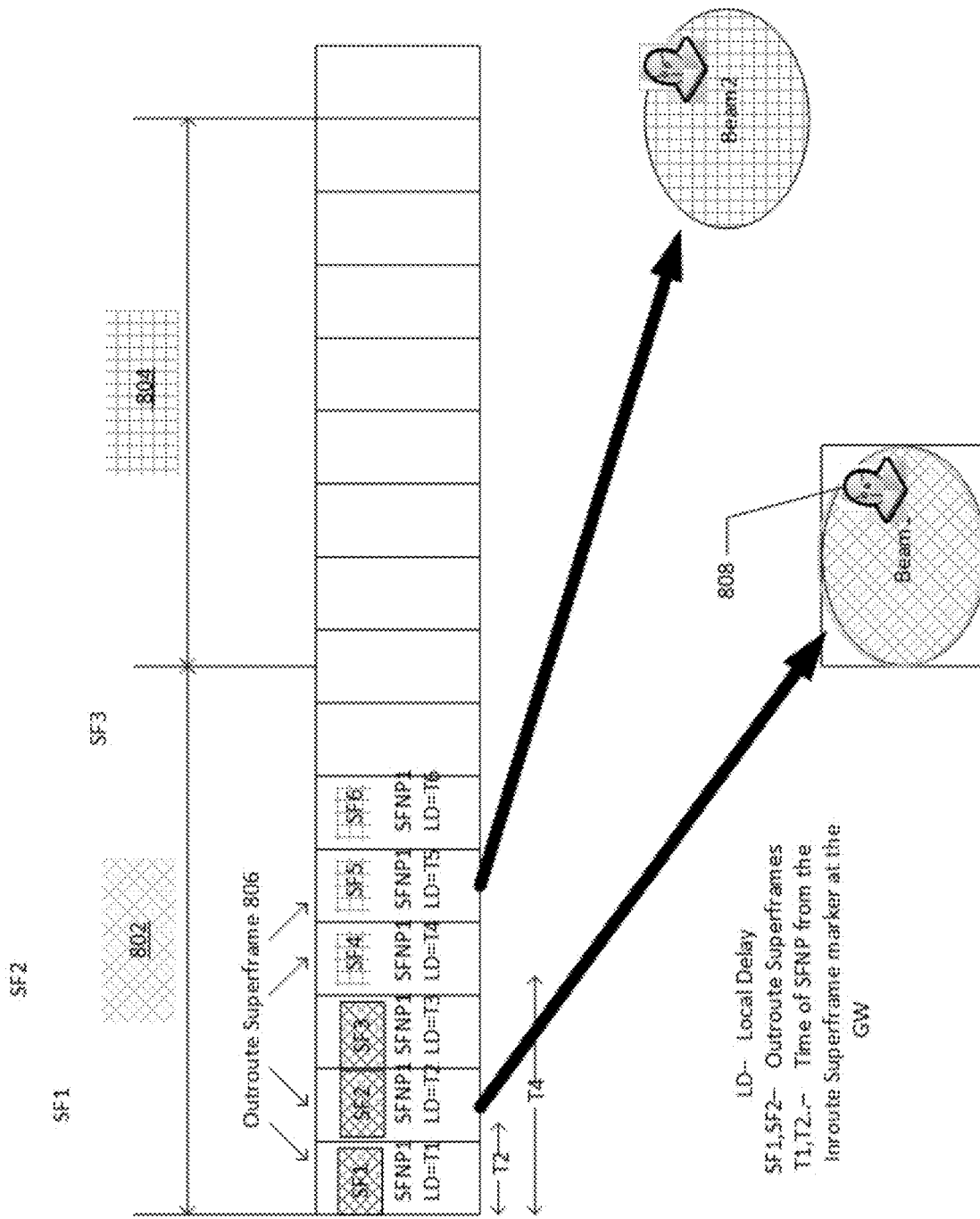
FIG. 8 illustrates inroute synchronization in a forward hopping system according to various embodiments.

FIG. 8 illustrates inroute synchronization in a forward hopping system according to various embodiments.

SFNP are sent every Outroute Superframe 806 as in FIG. 8 or once every dwelling period. A terminal is sent a local delay value which is the sum of the local delay in the GW and the delay from the 360 ms Inroute superframe marker by a receiving gateway. In some embodiments, the Inroute superframe 802 is synchronized to a SFNP marker (typically at a 360 ms interval) that is sent to a terminal 808 via the Outroute. Since the terminal 808 does not see all Outroute Superframes in a beam hopping system, SFNPs may be sent once at a first Outroute Superframe of every Forward dwell time. The SFNP may contain the delay from the start of the Inroute Superframe added to the local delay.

In some embodiments, the terminal 808 may transmit even when an Outroute is not present. In a beam hopping system, the terminal 808 may claim to be locked to the Outroute as long as it receives 1 Superframe over a period, for example, a period equal to 32 Superframes. During the interval when no Outroute is present, no SFNP packets may be received. However, the terminal may continue to transmit using the last received SFNP timing. Because of beam hopping, CLT messages from the gateway may take an additional time to reach the terminal 808. This may add another delay to the gateway to satellite to terminal delay. As such, the timing effect due to satellite motion may be small enough not to prompt a change in the aperture sizes.

Each beam hopping set of beams may have at least one BHST at startup. After the system becomes operational and user terminals are installed, the gateway may assign any terminal as a BHST. A gateway may have multiple BHSTs in each beam and may use the information either from just one with highest return SNR or combine it from various BHSTs. When a BHST goes into outage, that BHST can be replaced with another BHST.

After an outage has occurred at the gateway, the gateway may revert to acquisition mode depending on the time elapsed since outage occurred. If the time elapsed is not large and the gateway has the timing knowledge, then the system might be kept in tracking. A change in BHTP might be applied as desired, for example, periodically. The change may be synchronized between the gateway and the satellite.

Adjacent beam interference in a beam hopping system may impact performance and synchronization. Various BHTPs across the system may be selected not to have two adjacent beams on the same carrier at the same time. A BHST may be disposed in the center of a beam to avoid adjacent beam interference.

In exemplary embodiments, return beam hopping is asynchronous with the forward beam hopping. A terminal to assist in synchronization need not be a special unit. Each user terminal may receive signals from only one gateway at a time. At least one terminal that can aid in synchronization (BHST) may be present in a set of user beams being switched. Inroute frame time and satellite dwell time on one beam may have an integral relationship with each other. All the BHSTs in beams switched by one beam hopping unit on the satellite may transmit on the same Inroute carrier symbol rate during acquisition. All the BHSTs in beams switched by one beam hopping unit on the satellite may transmit on different assigned frequencies during acquisition phase. The BHRSP length may have an integral relationship with the satellite dwell time in one beam.

Return Beam Hopping Synchronization

In exemplary embodiments, a return channel or Inroute on a satellite network utilizes a MF-TDMA channel. Terminals are assigned access to a channel based on demand. The synchronization design on the network is such that the bursts sent by the terminals are received at the GW at a known pre-assigned time instant. Essentially the return channel is synchronized to the gateway clock. The gateway sends Superframe Numbering Packets (SFNP) on the Outroute to each terminal to signal the timing on the gateway. Each terminal uses this information and calculates the exact time instant at which to send the burst such that the burst arrives at the gateway at the time instant allotted for that terminal. Due to the different locations of each terminal the time delay between a terminal and a satellite are different. Further, as the satellite moves in its orbit, the propagation time between the fixed terminal and the gateway via the satellite varies continuously. These variations require that each gateway and terminal execute procedures to determine exactly when the terminal should transmit a data burst, so that it will arrive at the gateway at the assigned times.

Figure 9:
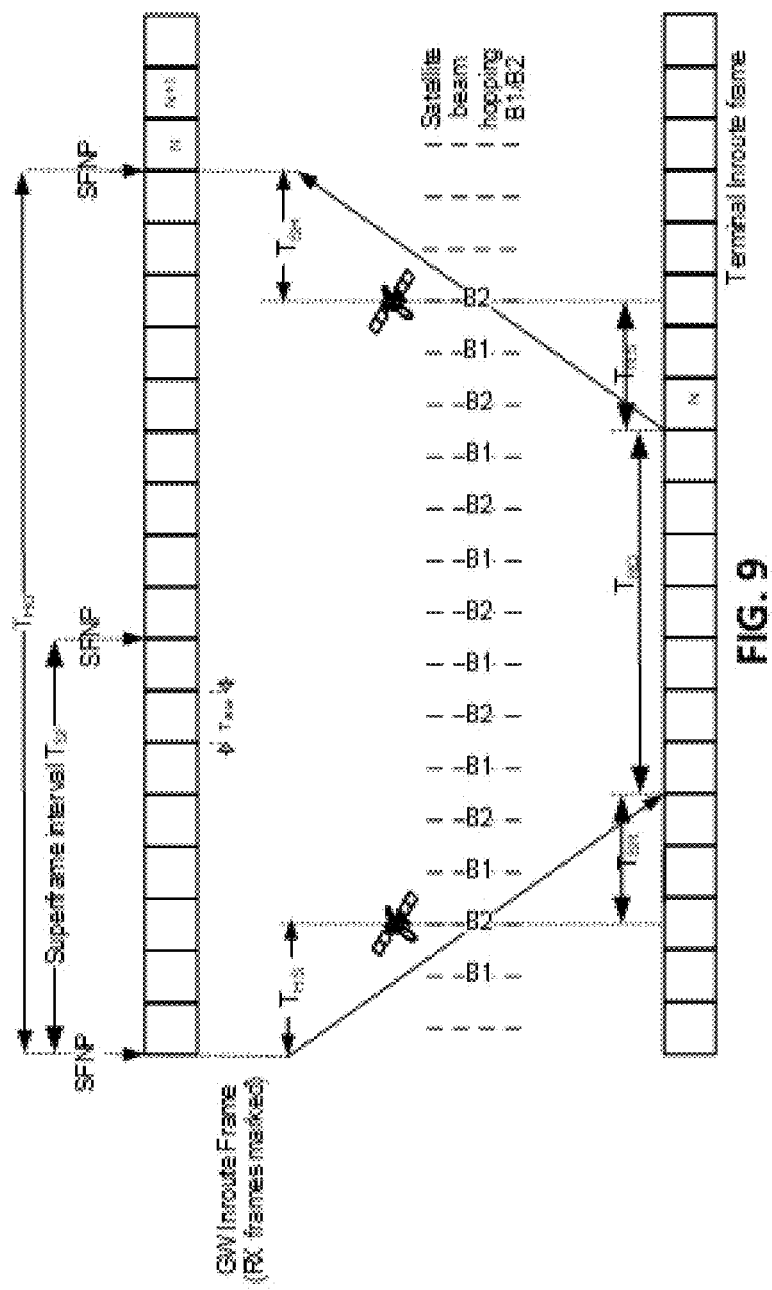
FIG. 9 illustrates timing relationships and a synchronization on a system hopping between beams B1 and B2 every inroute frame time according to various embodiments.

FIG. 9 illustrates timing relationships and a synchronization on a system hopping between beams B1 and B2 every inroute frame time according to various embodiments.

Each gateway controls its timing on the return channel for each beam independently. The SFNP may be generated every 360 milliseconds by the gateway and sent on the Outroute to every terminal via a unicast stream. The terminal using the arrival instant of the SFNP and the other timing parameters of the system calculates the exact time when to transmit its burst. The timing relationships of FIG. 9 is: $T_{HO}=T_{HS}+T_{SR}+T_{RO}+T_{RS}+T_{SH}$, where:

$T_{HO}$: gateway offset time (time interval between the ideal instant of transmission of SFNPN at the gateway and the start of reception of frame N at the gateway) (also known as space-time offset (STO))

$T_{HS}$: propagation time from gateway to satellite (same value as $T_{SH}$)

$T_{SR}$: propagation time from satellite to terminal (same value as $T_{RS}$)

$T_{RO}$: terminal offset time (Time between "ideal" receipt of SFNPN at a terminal and the transmit time for the start of transmission for frame N at this terminal). The terminal calculates this.

$T_{RS}$: propagation time from terminal to satellite $T_{SH}$: propagation time from satellite to gateway $SFNP_N$: Superframe numbering packet that marks frame N The gateway-to-satellite round-trip time, $T_{HS}+T_{SH}$, can also be written as $T_{HSH}$. The terminal to satellite round trip time can be written as $T_{SRS}=T_{SR}+T_{RS}$. Then: $T_{HO}=T_{HSH}+T_{SR}+T_{RO}+T_{RS}$. The terminal offset time $T_{RO}$ can then be expressed as: $T_{RO}=T_{HO}-T_{HSH}-T_{SRS}$.

As shown in FIG. 9, the gateway starts the inroute TDMA frame N one-time interval, $T_{HO}$, after it transmits the $SFNP_N$. $T_{HO}$ must be set large enough that an SFNP can be received by a terminal that is farthest from the satellite, have that terminal do some processing (say two frames worth), then transmit a data burst in time to be received back at the gateway at the start of the frame number given in the SFNP packet. If $T_{HO}$ satisfies this condition, it means that a terminal can receive a bandwidth allocation packet (BAP) and have sufficient time for processing it and transmit a burst on the bandwidth allocated in the BAP.

In a beam hopping system, the return channel may be synchronized at the satellite so that the bursts reach the satellite during the window in which the satellite is serving that beam. In exemplary embodiments, the SFNP timing markers generated at the gateway are aligned to the satellite switching time instants. In exemplary embodiments, the frame time and satellite switching time have an integral relationship.

This ensures a terminal bandwidth allocation for a time instant at the gateway is aligned with the satellite switching time instants. In FIG. 9, when the inroute frame time at the gateway is aligned (SFNP is aligned) with the satellite switching time, and the gateway allocated frame N to B2, the terminal at B2 transmits happens exactly when the satellite is looking at B2. The inroute frame N+1 is allotted to beam B1 and so on.

In some embodiments, the system may be synchronized without aligning the SFNP (frame time) with the satellite switching. In this embodiment, the system must constantly calculate which beam is being served at what time instant and as the satellite moves, this relationship varies. Also, if the frame time and switching time instants don't have an integral time relationship, the synchronization process can be broken down into two stages, acquisition and tracking just as in the forward beam hopping synchronization.

In exemplary embodiments, a terminal may use TDMA bursts in a continuous fashion to aid in acquisition. During installation, after having found and locked to the Outroute, a BHST will receive information on whether to transmit and what frequency channel to transmit on. The terminal may transmit a signal continuously on the assigned frequency to the gateway. At least one BHST in various beams may use the same symbol rate to transmit the BHRSP. The symbol rate may be chosen based on the maximum symbol rate any terminal in the beam could achieve. The BHRSP symbols may be QPSK mapped to provide robustness. The BHST in beams forming part of a beam hopping set may be assigned different frequencies. The BHST may be preprogrammed with this pattern or the pattern can be broadcast by the gateway.

Once the gateway detects the BHRSP, estimates the satellite switching time and synchronizes its clock to the satellite switching time, the gateway may then signal to the BHST to stop transmitting the BHRSP. The BHRSP length may be configurable and may be an integral multiple of the switching time. In some embodiments, a BHRSP length may not be greater than one half the minimum switching time of a BHTP. The BHRSP length can be different for different sets of BHTPs.

The GW may use the BHRSP as timing markers to synchronize the GW inroute timing with the satellite switching. During acquisition, the gateway may continuously search for the BHRSP by correlating the incoming signal with the known pattern. After having detected the first BHRSP (detection may mean that the correlation value exceeds a threshold), the gateway would know the position of the rest of the BHRSPs more accurately and can narrow the search window to a few symbols. The gateway may estimate the number of symbols of the BHRSP received for all the successive BHRSPs.

If a gateway has a BHST in each of the different switching beams, then the BHRSP arrival time and the number of BHRSP detected could be different for each beam since they each transmit asynchronously. The BHRSP correlation peaks will provide the location of arrival of each BHRSP from the various beams. The gateway can process each beam's BHRSP in a parallel fashion when received on different frequency channels. The BHRSP arrival time can be broken in to sets like the BHTP. Each set will have many consecutive BHRSP arrivals, after which there may be a gap in time and the next set of BHRSP may start.

Figure 10:
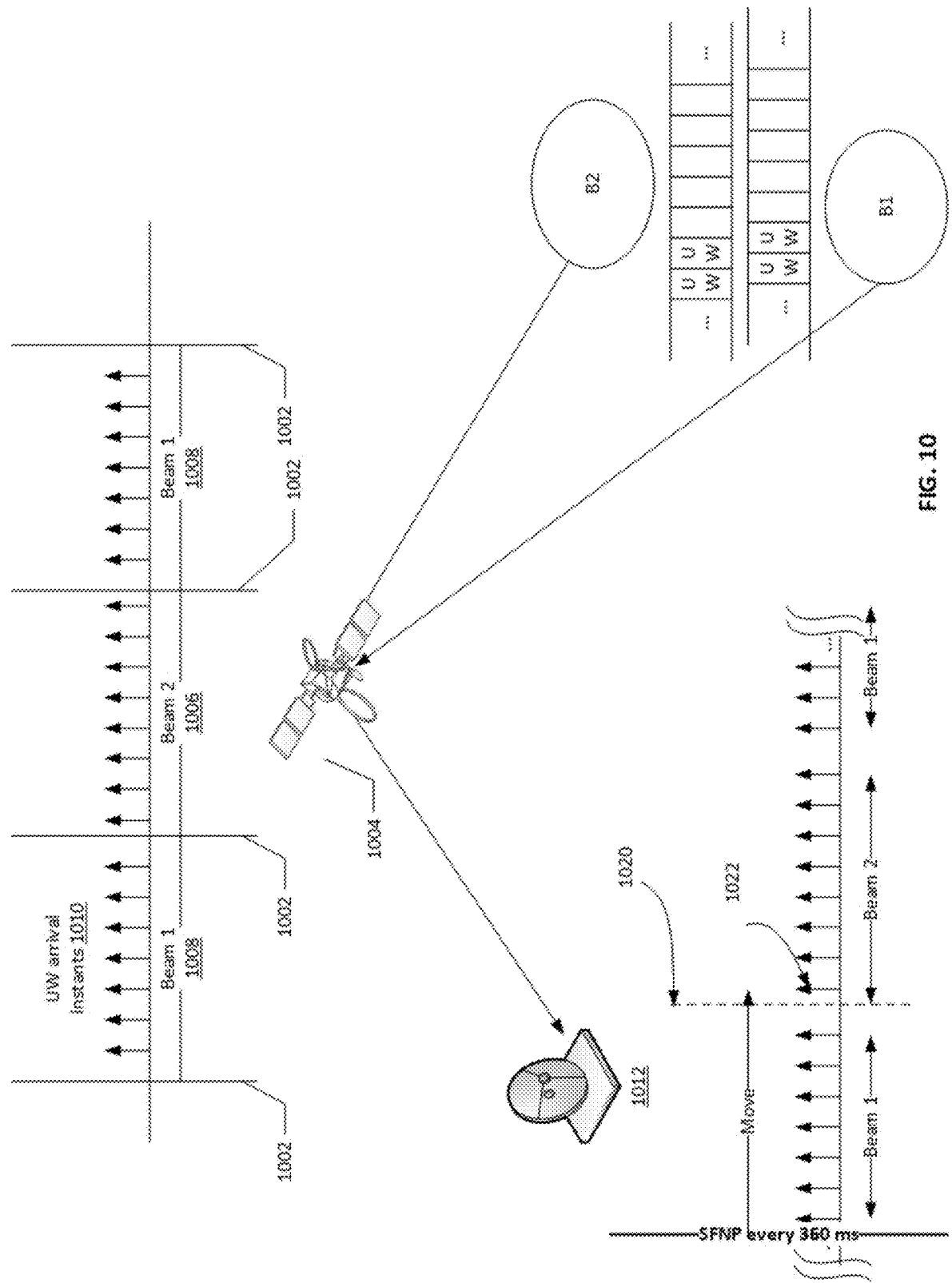
FIG. 10 illustrates an example of the satellite switching between two different beams dwelling equally between both.

FIG. 10 illustrates an example of the satellite switching between two different beams dwelling equally between both.

In FIG. 10, a satellite hopping system 1000 uses a switching period 1002 in a satellite 1004, where the switching period 1002 is an integral multiple of the Beam Hopping Return synchronization pattern (BHRSP) time. Even though in the satellite hopping system 1000, beams B1 and B2 are dwelt upon equally, more BHRSPs are detected during the B2 dwelling time 1006 than the Beam 1 dwelling time 1008. This may be evident by a count of Unique Word (UW) arrivals in the B2 dwelling time 1006 as compared to the Beam 1 dwelling time 1008. A gateway 1012 may process the B2 dwelling time 1006 than the Beam 1 dwelling time 1008 BHRSPs in a parallel fashion and store the timing markers and number of BHRSPs received from each beam. The gateway 1012 may estimate the number of symbols received for each of the BHRSP it receives after the first one is detected. Since the first and last BHRSP received during the satellite dwell time in a beam might not be received completely, it may result in a partial peak. After the BHRSP is detected, the number of BHRSP symbols received is estimated. All but the first and last BHRSP in a dwell time may have the same number of symbols (BHRSP length).

Since the number of BHRSPs in one switching interval is known, the gateway 1012 using the number of BHRSPs received and the number of symbols received for the last BHRSP received in a dwelling period can estimate the satellite switching times. A similar processing can be done for the other beams in the switching set and the results from the beam with the largest SNR could be used. Each switching period 1002 or dwell time (TD) in one beam would result in one set of estimates at the gateway 1012. These estimates are the number of BHRSPs detected, (M (TD)) and the length of symbols received for each of those P (TD)=(P (TD,i), i∈[1,M]). The first and last BHRSP in a TD might have a partial number of symbols received. A more accurate result may use an average pf the results from each dwell time starting with the one after the BHRSP is first detected. The gateway 1012 can distinguish between the different dwell times by the presence of a time gap in between two.

At the end of the averaging when enough accuracy in the estimates is obtained, the gateway may then move an Inroute Superframe timing marker 1020 to an estimated switching time instant 1022 of the satellite 1004. The satellite switching instant 1002 can be calculated by knowing the number of BHRSPs that should have been ideally received in that TD and by the BHRSP arrival timing markers and the number of symbols received in each. The satellite switching instant 1002 can be estimated to be N/2 symbols before the first full detection peak in any one TD. Once the SFNP is aligned to this time, the system can be moved in to the tracking phase and the BHST can be notified to stop transmitting the BHRSP.

The timing error after the acquisition phase depends on the symbol rate that the BHST can transmit on. The smaller the symbol time, the smaller the error. There may be an estimation error in the calculation of received BHRSP symbols. A guard period at the end of every switching instance allows for the satellite switching time and the error in estimating the exact satellite switching instant. See, for example, FIG. 4. No bandwidth allocations may be made in this guard period. This guard period may also be used to allow for variations in the synchronization from satellite motion, satellite clock drift and the like.

Forward and Return Beam Hopping Synchronization Together

When the system has both forward and return beam hopping, return beam hopping acquisition may happen before acquisition on the forward can occur. The forward beam hopping acquisition phase uses information transmitted from the BHST. To transmit from the BHST via the satellite, the return beam hopping has to be synchronized. The BHST may acquire the Outroute signal that may be the BHASF waveform. The BHAGI in the BHASF will contain information about whether the BHST aids in the return beam hopping synchronization and what frequency to transmit on. Once the FLL on the terminal is locked, the BHST may transmit the BHRSP and the gateway on receiving the signal may align the Inroute Superframe markers (SFNP) with the estimated satellite switching time. After the SFNP markers are aligned to the return satellite switching times, the BHST may be commanded again through BHAGI to stop transmitting the BHRSP and may be given a new channel assignment to transmit the TDMA based BHATI to assist in the forward acquisition phase. The forward beam hopping acquisition will occur right after this without any delay.

Once the forward acquisition phase is completed, both forward and return can be moved in to tracking phase. During the time when the forward acquisition is occurring, the return may not move in to the tracking phase.

A timing unit generates the markers for the SFNP packets. The timing unit may use the GPS 10 MHz clock and time of day to derive an Inroute Superframe timing, for example, a timing of 360 ms. Moving the markers in acquisition phase may amount to big jumps in time (milliseconds) to align with the satellite switch timing. Furthermore, the markers may be moved by small amounts in the tracking phase. The gateway may also change the duration between two SFNP markers during the tracking phase. Each beam hopping set may be associated with its own timing unit for SFNP generation. If this is not possible, then the beam switching on the satellite may be tied to one clock for all the beams belonging to one gateway. Since the SFNP markers timing and the duration between them is changing throughout the operation of the system and never fixed, the Outroute Modulator Module and the Inroute Demodulator Module utilize the same markers.

The tracking mode may be used to correct for any timing drifts that occur after acquisition has taken place. As the return channel is a MF-TDMA based, there is no continuous transmission that can help the gateway to stay synchronized with the satellite switching times. To this end, the gateway may utilize the information from the forward beam hopping tracking to alter the timing of the Inroute Superframe markers. The timing of the markers may be advanced or delayed with the same amount as the Outroute SOSF marker movement. The change in symbol rate of the Outroute may be used to derive the change required in the duration between two Inroute Superframe markers.

If the forward is not beam hopping, or if the timing errors on the return and forward are uncorrelated, then the return would require its own tracking. This can be achieved using the same mechanism as acquisition phase. A BHST may be dedicated for continuously transmitting the BHRSP. A portion of the spectrum may be reserved for transmitting the BHRSP.

In some embodiments, the terminals may rely on gateway feedback, for example, via CLT messages. to correct their timing as the satellite moves such that the bursts always arrive at the center of the receive aperture at the gateway. When the SFNP markers are being corrected or moved such that the satellite switching time instant is aligned with them, then the CLT corrections may only correct for the time variation in the satellite to terminal path. The terminals that are idle for a long time may use a BOOTSTRAP ALOHA message for the bandwidth request and receive a timing correction at that time.

In some embodiments, the BHTP may be different during acquisition and tracking of clock synchronization.

Gateway Diversity

Maintaining system capacity while it is raining on the gateway beam is challenging. Uplink power control can address nominal fade conditions, but heavy fade conditions require higher power transmitters and bigger antennas that will be under-utilized in clear sky conditions. Gateway diversity can be used to increase availability drastically. Gateway diversity is designed such that a certain amount of capacity in the system is maintained with each gateway at a certain availability criterion. Dynamically switching to a different (backup or secondary) gateway when the ambient attenuation exceeds a threshold allows maintaining the capacity and throughput of the system at a minimum.

In some embodiments, the Outroute may be switched to a backup RFT located in another position in the same gateway beam when the primary RFT has a poor link and cannot maintain the target capacity. A switching center may be used to determine when to switch between primary and backup sites. The switchover takes a finite amount of time (order of seconds) and during this time the terminals in the beams being served by the gateway lose the Outroute and will have to reacquire the signals. Since the location of the secondary or backup RFT and the Doppler due to the satellite motion may be different, the path delays between Gateway and satellite may change.

Figure 10A:
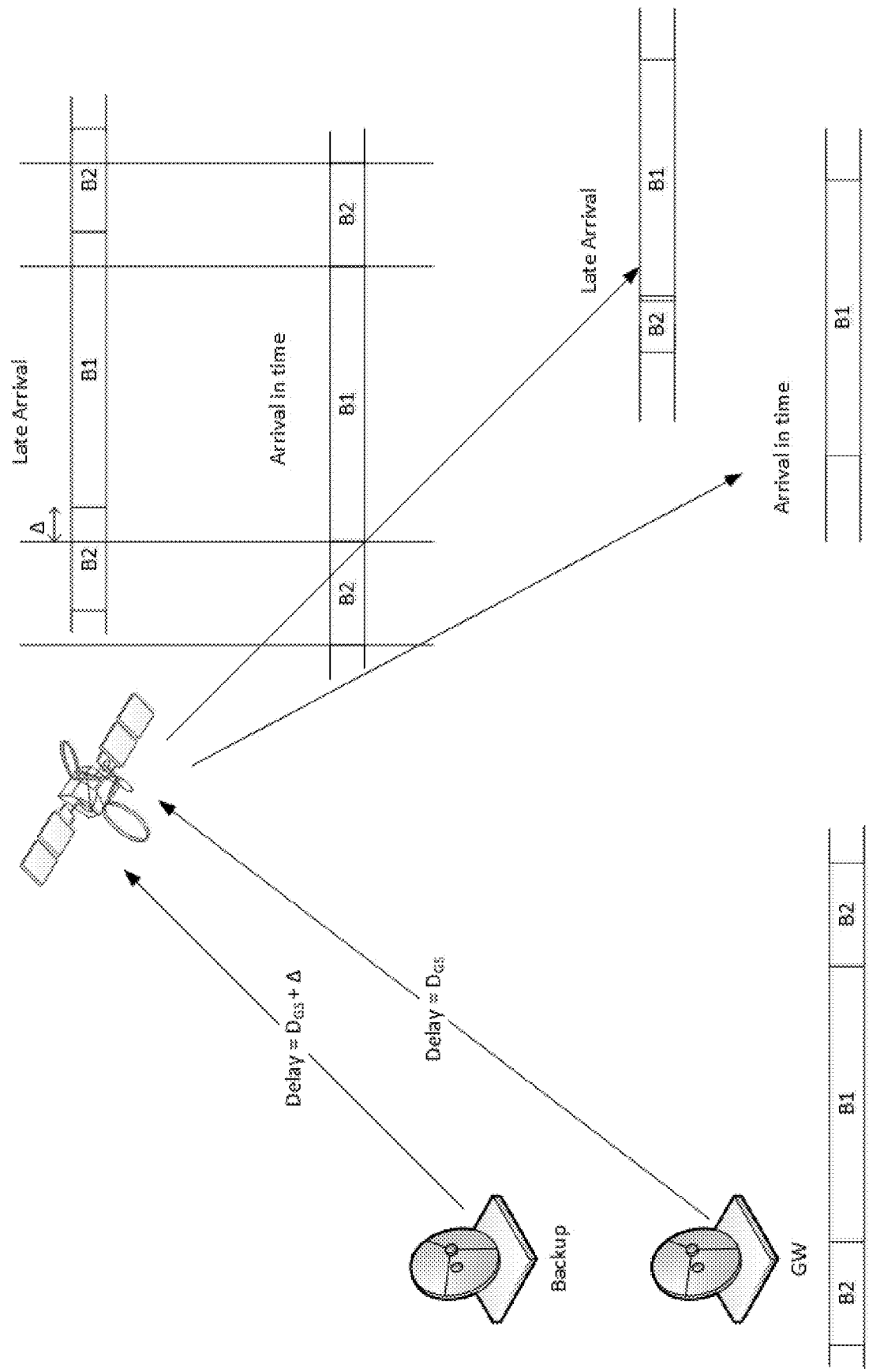
FIG. 10A illustrates an effect of gateway switchover on forward synchronization according to various embodiments.

FIG. 10A illustrates an effect of gateway switchover on forward synchronization according to various embodiments.

The gateway when switching to the secondary RFT may maintain the beam hopping synchronization to allowing for a seamless switchover. Since the switchover may be in the order of seconds, it can be assumed that the change in satellite motion/position and the satellite clock drifts would be negligible (but still in the order of a few symbols). If the satellite position was known, then the change in path delay between satellite and the two RFT and the change in Doppler could be calculated and used to change the timing and the symbol rate of the Outroute accordingly.

Since the satellite position is unknown, a difference in path delay in $T_{HSH}$ between the two RFT locations and a known satellite position (say CoB) may be used. This will introduce an error in the timing since the actual satellite position is different than CoB. To accommodate this error, the BHFSP length will be increased initially after the switchover. The BHFSP length may be increased by the number of symbols that is equivalent to the time of the error. The BHST would be notified of the impending switch, so it can expect a longer BHFSP. The gateway will also move the Outroute timing such that the satellite switching occurs at the target with respect to the new BHFSP length. The BHST will estimate the number of symbols received and send the feedback to the gateway which may use the information to change the timing on the Outroute. The initial jump might be large and may be done outside of the closed loop feedback method. Once the initial jump is done and the Outroute symbol timing is close to the target in symbols, the BHFSP length can be reduced to the original length and the feedback loop can work as described above. This helps in reducing the total switching time. In some embodiments, the system may go back to acquisition mode after the switchover.

For Inroute synchronization, the system could be in two different modes, Bootstrap or Steady state. If the system is in BOOTSTRAP mode on the Inroute, then CLT corrections are provided for all the active terminals and the IDLE terminals transmit a BOOTSTRAP ALOHA for bandwidth requests. Once the gateway switchover occurs, the active terminals $T_{RO}$ computation based on CLT will be incorrect. All the terminals may be forced to use the BOOTSTRAP ALOHA to request for bandwidth and to receive timing corrections. To send the BOOTSTRAP ALOHA, a new $T_{HSH}$ value ($T_{HSH}$ (Gb, S (COB))) for the backup gateway may be used.

In steady state mode, the active terminals may use CLT messages to calculate the $T_{RO}$ whereas those that have been idle and have saved references may use the $T_{HSH\_EST}$ to calculate the $T_{RO}$ and send a normal aperture ALOHA. After switchover, the steady state mode can be maintained since the backup RFT is in the same gateway beam and the amount of error from the above equation is small. The $T_{HSH\_EST}$ may be changed to $$T_{HSH\_EST}(Gb,S(L))=T_{HSH\_EST}(Gp,S(L))+T_{HSH}(Gb,S(COB))-T_{HSH}(Gp,S(COB))$$

All terminals (active or IDLE) may use this new $T_{HSH\_EST}$ to calculate the $T_{RO}$. The active terminals once they receive a CLT can correct the $T_{RO}$.

In a return beam hopping system, the Inroute synchronization is done by synchronizing the timing at the GW and the satellite switching time. After a switchover occurs in a diversity system, the GW timing will no longer be aligned with the satellite switching time. The SFNP markers timing may be changed initially to address the change in satellite to gateway delay. The offset added to the markers is $T_{HSH}$(Gb, S(COB))–$T_{HSH}$(Gp, S(COB)). This may initially introduce an error that may be offset by increasing the length of the guard time at the beginning of each of the switching times.

A beam hopping system with an N-to-1 gateway diversity could have two different configurations. In one configuration, the backup GW could act as a 'cold' standby where it is called in to action only when one of the N primary GW experience a heavy rain fade condition. In another configuration, the backup gateway might act as a 'hot' standby where some of the beams are regularly served by the backup for a short period of time.

An error in timing for the backup gateway may be larger as compared to the primary gateway, as the backup GW is typically remote from the primary gateway. This can result in the BHFSP length to change drastically. A centralized processing hub may maintain the timing for the Outroute when a switchover occurs. In some embodiments, the system can transition to beam hopping acquisition when switching gateways dependent on the time acquisition takes and the time available to do a complete switch.

Inroute synchronization in the steady state mode may have to revert to the BOOTSTRAP mode. The error in the $T_{RO}$ calculation even if using the new $T_{HSH}$ may have an error that cannot be tolerated in steady state mode. In some embodiments, the centralized processing hub may maintain the timing for the SFNP markers.

Figure 11:
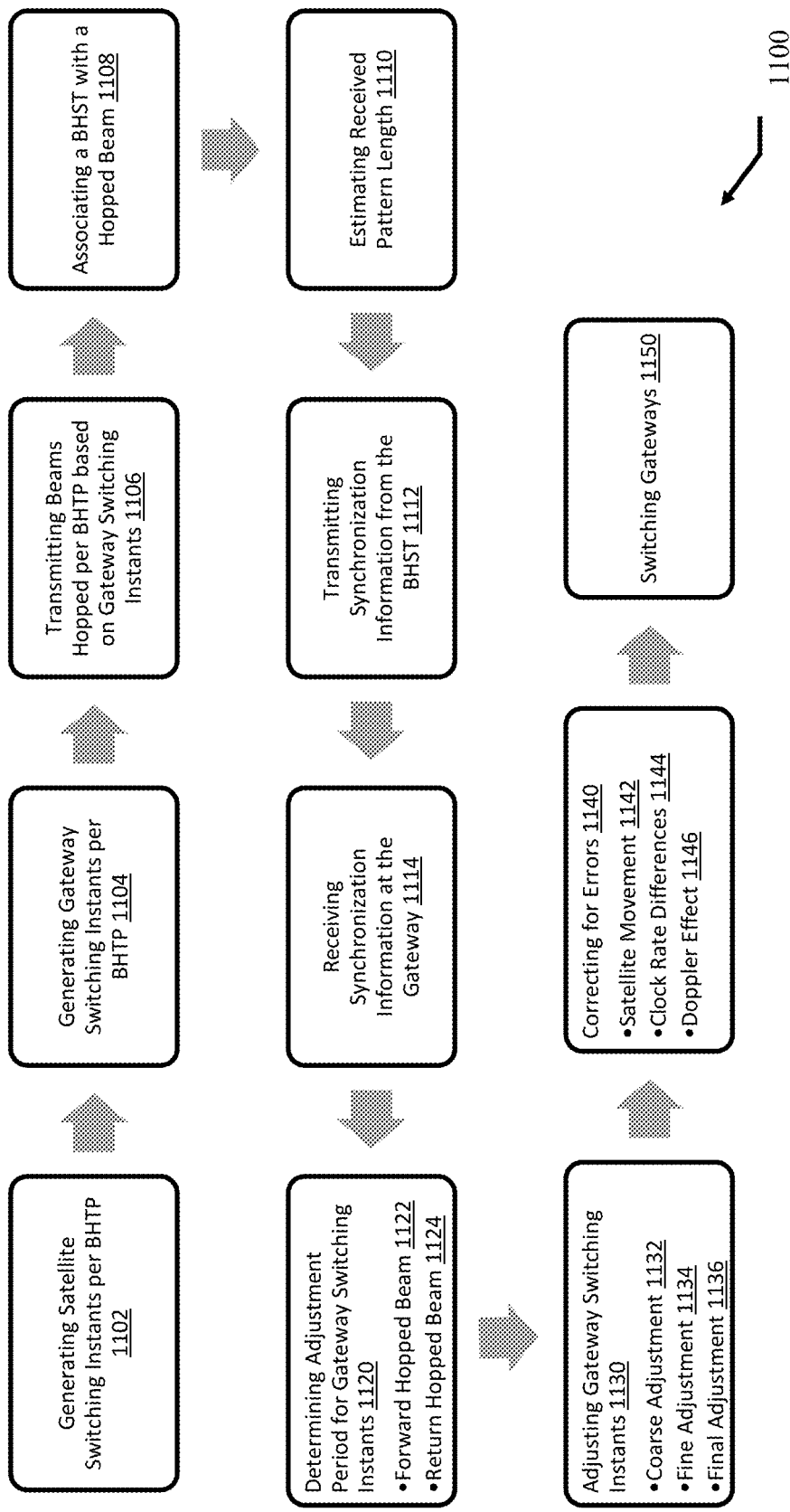
FIG. 11 illustrates a method for timing synchronization of satellite switching instants with gateway switching instants according to various embodiments.

FIG. 11 illustrates a method for timing synchronization of satellite switching instants with gateway switching instants according to various embodiments.

In exemplary embodiments, a method 1100 for timing synchronization of satellite switching instants with gateway switching instants is described. The method 1100 may include an operation 1102 for generating satellite switching instants per a BHTP. The method 1100 may include an operation 1104 for generating gateway switching instants per the BHTP. The method 1100 may include an operation 1106 for transmitting beams hopped per the BHTP based on the gateway switching instants.

In some embodiments, the method 1100 may include an operation 1108 for associating a BHST with a hopped beam. The method 1100 may include an operation 1110 for estimating a received pattern length, for example, by calculating a correlation length of a timing marker in the hopped beam. The method 1100 may include an operation 1112 for transmitting synchronization information from the BHST for a forward beam hopping system. In some embodiments, the synchronization information of operation 1112 may include the BHRSP for a return beam hopping system. The method 1100 may include an operation 1114 for receiving synchronization information at the gateway.

The method 1100 may include an operation 1120 for determining an adjustment period for gateway switching instants. The operation 1120 may include an operation 1122 for determining an adjustment period for a forward hopped beam. The operation 1120 may include an operation 1124 for determining an adjustment period for a return hopped beam. In some embodiments, operation 1124 might be based on the forward beam hopping information, only if forward beam hopping is present, otherwise operation 1024 may use the BHRSP information.

The method 1100 may include an operation 1130 for adjusting the gateway switching instants. The operation 1130 may include an operation 1132 for coarse or stage 1 timing adjustment. The operation 1130 may include an operation 1134 for fine or stage 2 timing adjustment. The operation 1130 may include an operation 1136 for final or stage 3 timing adjustment.

The method 1100 may include an operation 1140 for correcting for errors. The operation 1140 may include an operation 1142 to correct for satellite movement. The operation 1140 may include an operation 1144 to correct for clock rate differences. The operation 1140 may include an operation 1146 to correct for a doppler effect. The method 1100 may include an operation 1150 to correct for switching gateways.

Figure 12:
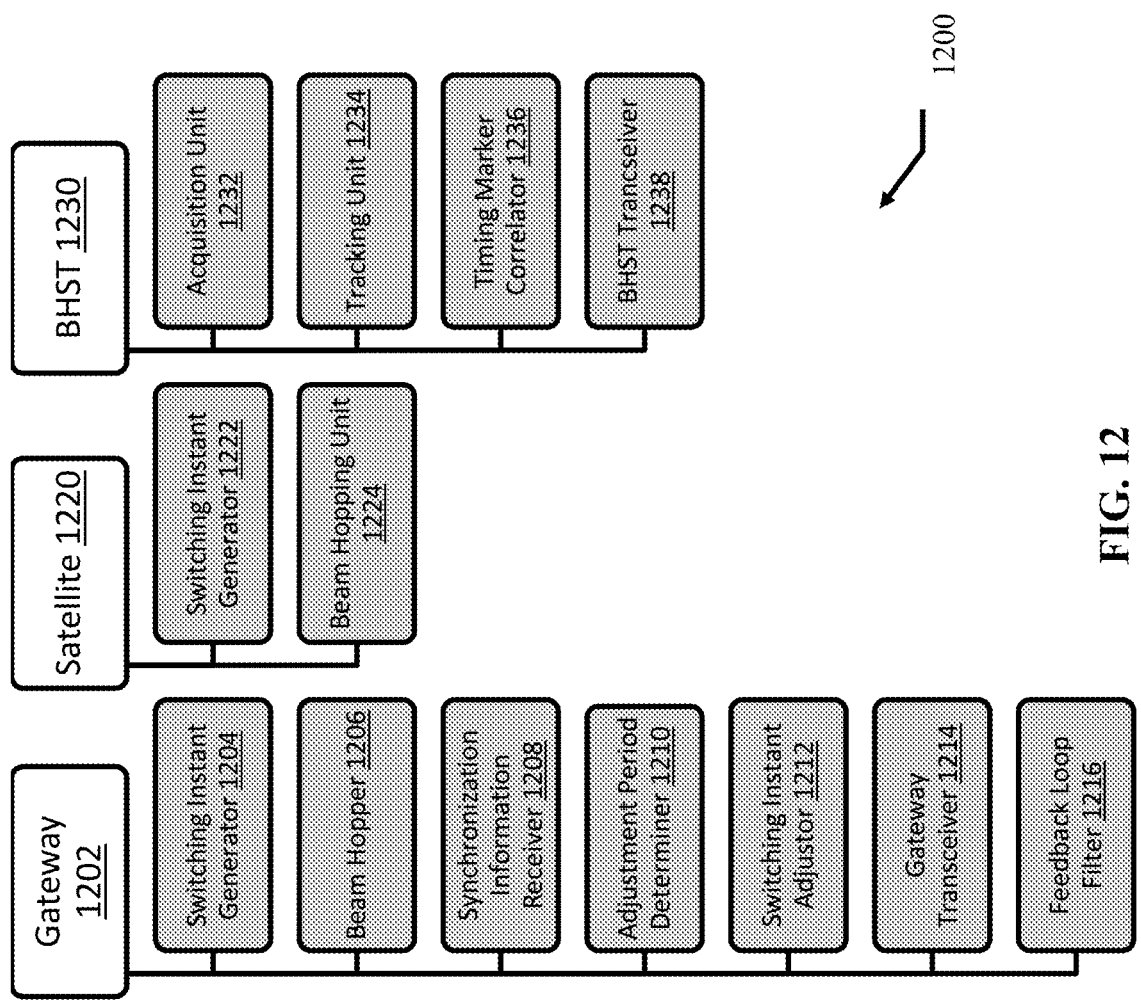
FIG. 12 illustrates a logical diagram for a system for timing synchronization of satellite switching instants with gateway switching instants according to various embodiments.

FIG. 12 illustrates a logical diagram for a system for timing synchronization of satellite switching instants with gateway switching instants according to various embodiments.

A system 1200 for timing synchronization of satellite switching instants with gateway switching instants is described. The system 1200 may include a gateway 1202. The system 1200 may include a switching instant generator 1204 to generate switching instants per a BHTP. The system 1200 may include a beam hopper 1206 to multiplex beams into a channel/signal in a TDMA fashion per the BHTP. The system 1200 may include a synchronization information receiver 1208. The system 1200 may include an adjustment period determiner 1210 to determine an adjustment period for the gateway's switching instant generator 1204 to synchronize with a satellite 1220's switching instant generator 1222. The system 1200 may include a switching instant adjustor 1212 to adjust the switching instant generator 1204. The system 1200 may include a gateway transceiver 1214. The system 1200 may include a feedback loop filter 1216, for example, per FIG. 7.

The system 1200 may include a satellite 1220 in communication with the gateway 1202 via the gateway transceiver 1214. The system 1200 may include a switching instant generator 1222 to generate switching instants. The system 1200 may include a beam hopping unit 1224. When the system 1200 includes a forward beam hopping system, the beam hopping unit 1224 may de-aggregate a signal from the gateway 1202 into multiple beams in a TDMA fashion per a BHTP. When the system 1200 includes a return beam hopping system, the beam hopping unit 1224 may aggregate multiple beams into one signal in a TDMA fashion per a BHTP, which signal may be transmitted to the gateway 1202. In some embodiments, the aggregation or de-aggregation may be performed outside the beam hopping unit 1224.

The system 1200 may include a BHST 1230. The BHST 1230 may include an acquisition unit 1232 to provide synchronization information to the gateway 1202 in an acquisition phase. The BHST 1230 may include a tracking unit 1234 to provide synchronization information to the gateway 1202 in a tracking phase. The BHST 1230 may include a timing marker correlator 1236 to calculate a correlation length for the timing markers received by the BHST 1230. The BHST 1230 may include a transceiver 1238 to transmit and receive synchronization information. In some embodiments, the transceiver 1238 may transmit a BHRSP to the gateway 1202.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A method for synchronizing satellite switching instants with gateway switching instants, the method comprising:
    hopping, at a satellite, a channel signal among multiple beams according to a Beam Hopping Time Plan (BHTP);
    transmitting, from a gateway, the channel signal comprising a Beam Hopping Forward Synchronization Pattern (BHFSP) comprising timing markers;
    receiving, at a terminal, a RX signal comprising the BHFSP, wherein the RX signal corresponds to a portion of the channel signal;
    estimating a length of the timing markers of the BHFSP of the RX signal; and
    adjusting, at the gateway, a timing of the channel signal transmission based on the length of the timing markers.

2. The method of claim 1, wherein the estimating comprises estimating a length of the BHFSP received at the terminal.

3. The method of claim 1, wherein the gateway allocates bandwidth for the user terminal in a Time Division multiple access (TDMA) mode.

4. The method of claim 1, wherein the timing markers are disposed in a Superframe having a boundary, and one of the timing markers comprises a start of the boundary of the Superframe.

5. The method of claim 1, further comprising transmitting, from the terminal to the gateway, synchronization information comprising the length of the timing markers.

6. The method of claim 1, wherein the adjusting selects from one of altering the timing without altering the symbol rate, altering the symbol rate without altering the timing, and altering the timing and the symbol rate.

7. The method of claim 1, wherein a length of a guard period for a satellite switching instant is based on a satellite switching time and a timing uncertainty.

8. The method of claim 1, further comprising:
    hopping a return beam from a user terminal;
    hopping a forward beam to the user terminal; and
    acquiring synchronization for the hopping of the return beam prior to acquiring synchronization for the hopping of the forward beam.

9. The method of claim 1, further comprising:
    switching from the gateway to a backup gateway by determining a backup gateway adjustment period and a backup gateway adjusted symbol rate for backup gateway switching instants; and
    adjusting the timing and symbol rate of the backup gateway switching instants according to the backup gateway adjustment period.

10. A system comprising:
    a beam hopping unit in a satellite to hop a channel signal among multiple beams according to a Beam Hopping Time Plan (BHTP);
    a transceiver in a gateway to transmit the channel signal comprising a Beam Hopping Forward Synchronization Pattern (BHFSP) comprising timing markers;
    a terminal to receive a RX signal comprising the BHFSP, wherein the RX signal corresponds to a portion of the channel signal;
    an adjustment period determiner to estimate a length of the timing markers of the BHFSP of the RX signal; and
    a switching instant adjustor at the gateway to adjust a timing of the channel signal transmission based on the length of the timing markers.

11. The system of claim 10, wherein the adjustment period determiner is configured to estimate a length of the BHFSP received at the terminal based on correlating the RX signal with the BHFSP.

12. The system of claim 10, wherein the gateway allocates bandwidth for the user terminal in a Time Division multiple access (TDMA) mode.

13. The system of claim 10, wherein the timing markers are disposed in a Superframe having a boundary, and one of the timing markers comprises a start of the boundary of the Superframe.

14. The system of claim 10, wherein the terminal transmits synchronization information comprising the length of the timing markers to the gateway.

15. The system of claim 10, wherein the switching instant adjustor selects from one of altering the timing without altering the symbol rate, altering the symbol rate without altering the timing, and altering the timing and the symbol rate.

16. The system of claim 10, wherein a length of a guard period for a satellite switching instant is based on a satellite switching time and a timing uncertainty.

17. The system of claim 16, further comprising:
    a backup gateway;
    wherein the adjustment period determiner switches from the gateway to the backup gateway by determining a backup gateway adjustment period and a backup gateway adjusted symbol rate for backup gateway switching instants; and
    the switching instant adjustor adjusts a timing and a symbol rate of the backup gateway switching instants according to the backup gateway adjustment period.

18. The system of claim 10, further comprising: a return hopping beam to communicate from the terminal; and a forward hopping beam to communicate to the terminal, wherein the switching instant adjustor acquires synchronization for the return hopping beam prior to acquiring synchronization for the forward hopping beam.

* * * * *